(12) United States Patent
Comaniciu et al.

(10) Patent No.: US 7,027,643 B2
(45) Date of Patent: Apr. 11, 2006

(54) SYSTEMS AND METHODS FOR AUTOMATIC SCALE SELECTION IN REAL-TIME IMAGING

(75) Inventors: Dorin Comaniciu, Princeton, NJ (US); Visvanathan Ramesh, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 362 days.

(21) Appl. No.: 10/345,131

(22) Filed: May 15, 2003

(65) Prior Publication Data

US 2003/0169942 A1    Sep. 11, 2003

Related U.S. Application Data

(62) Division of application No. 10/147,092, filed on May 16, 2002.

(60) Provisional application No. 60/291,370, filed on May 16, 2001.

(51) Int. Cl.
*G06K 9/00* (2006.01)
(52) U.S. Cl. .................. 382/162; 382/164; 382/225
(58) Field of Classification Search ............ 382/162, 382/164, 173, 225, 288
See application file for complete search history.

(56) References Cited

U.S. PATENT DOCUMENTS 5,507,025 A * 4/1996 Rodeffer .................. 455/266
6,430,430 B1 * 8/2002 Gosche .................... 600/410

\* cited by examiner

*Primary Examiner*—Phuoc Tran
(74) *Attorney, Agent, or Firm*—Donald B. Paschburg; F. Chau & Associates, LLP

(57) ABSTRACT

A system and method for automatic scale selection in real-time image and video processing and computer vision applications. In one aspect, a non-parametric variable bandwidth mean shift technique, which is based on adaptive estimation of a normalized density gradient, is used for detecting one or more modes in the underlying data and clustering the underlying data. In another aspect, a data-driven bandwidth (or scale) selection technique is provided for the variable bandwidth mean shift method, which estimates for each data point the covariance matrix that is the most stable across a plurality of scales. The methods can be used for detecting modes and clustering data for various types of data such as image data, video data speech data, handwriting data, etc.

20 Claims, 13 Drawing Sheets

SYSTEMS AND METHODS FOR AUTOMATIC SCALE SELECTION IN REAL-TIME IMAGING

CROSS REFERENCE TO RELATED APPLICATIONS

This application is a Divisional Application of U.S. patent application Ser. No. 10/147,092, filed on May 16, 2002, which claims priority to U.S. Provisional Application Ser. No. 60/291,370, filed on May 16, 2001, which are both fully incorporated herein by reference.

TECHNICAL FIELD

The present invention relates generally to a system and method for automatic scale selection for feature space analysis and partitioning in various applications, including, real-time imaging and video processing and computer vision applications. More specifically, the invention relates to a non-parametric variable bandwidth mean shift method that is based on adaptive estimation of a normalized density gradient to accurately detect one or more modes in underlying data and to cluster the data. The invention further relates to a data-driven bandwidth (or scale) selection technique for the variable bandwidth mean shift method, which estimates for each data point the covariance matrix that is the most stable across a plurality of scales.

BACKGROUND

Reliable data-driven bandwidth (or "scale") selection for kernel-based nonparametric analysis of multivariate data is complex and largely unanswered by the current techniques. Depending on the prior knowledge on input data, two classes of problems can be distinguished. If the data statistics are homogeneous, then one global bandwidth suffices for the analysis. If, however, the data statistics are changing across the feature space, local bandwidths should be computed. Unfortunately, most of the tasks encountered in autonomous vision reduce to the latter class of problems, i.e., the input is represented by multidimensional features, whose properties are variable in space (and might change in time). Examples of such tasks are background modeling, tracking, or segmentation.

Statistical methods compute the global bandwidth as the bandwidth that achieves the best balance between the bias and variance of the density estimate obtained with that bandwidth, over the entire space. For the univariate, case, a reliable method for computing a global bandwidth is the known "plug-in rule" (see, e.g., S. J. Sheather, et al., "A Reliable Data-based Bandwidth Selection Method for Kernel Density Estimation", *J. Royal Statist. Soc. B.* 53(3):683 690. 1991)), which has been shown to be superior to least squares cross validation and biased cross-validation estimation methods. The only assumption with the plug-in rule is the smoothness of the underlying density. Although the plug-in rule may be used to efficiently compute the global bandwidth, the global bandwidth is not effective when data exhibits multi-scale patterns. In addition, for the multivariate case, the optimal bandwidth formula is of little practical use, since it depends on the Laplacian of the unknown density being estimated.

Another global bandwidth selection approach relates to the stability of the decomposition. The bandwidth is taken as the center of the largest operating range over which the same number of partitions are obtained for the given data. This strategy is also implemented within the framework of scale-space theory and relies on the space homogeneity assumption. All the partitions should have roughly the same scale, which is not always true.

A commonly used method for computing local bandwidths follows Abramson's rule which takes the bandwidth proportional to the inverse of the square root of a first approximation of the local density (see, e.g., Abramson, "On Bandwidth Variation in Kernel Estimates—A Square Root Law", *The Annals of Statistics,* 10(4):1217–1223, 1982). The proportionality constant is an important choice of the method.

In a different class of techniques, the optimal bandwidth maximizes an objective function, which expresses the quality of the decomposition and is called index of cluster validity. The objective function compares inter-versus intra-cluster variability, or evaluates the isolation and connectivity of the delineated clusters. Nevertheless, the choice of the objective function is most often empirical and lacks statistical significance.

The following discusses the fixed bandwidth kernel density estimation method (see, e.g., D. W. Scott, "*Multivariate Density Estimation*", New York, Wiley, 1992). Given a set $$\{x_i\}_{i=1\ldots n}$$

of n points in a d-dimensional space $R^d$, the multivariate fixed bandwidth kernel density estimate with kernel K(x) and window radius (bandwidth) h, computed in the point x is defined by $$\hat{f}(x) = \frac{1}{nh^d}\sum_{i=1}^{n} K\left(\frac{x-x_i}{h}\right) \qquad (1)$$

where the d-dimensional vectors $$\{x_i\}_{i=1\ldots n}$$

represent a random sample from some unknown density f and the kernel, K, is taken to be a radially symmetric, non-negative function centered at zero and integrating to one. The terminology fixed bandwidth is due to the fact that h is held constant across $x \in R^d$. As a result, the fixed bandwidth procedure (1) estimates the density at each point x by taking the average of identically scaled kernels centered at each of the data points.

For pointwise estimation, the classical measure of the closeness of the estimator $\hat{f}$ to its target value f is the mean squared error (MSE), equal to the sum of the variance and squared bias:

$$MSE(x) = E[\hat{f}(x)-f(x)]^2 = Var(\hat{f}(x)) + [Bias(\hat{f}(x))]^2 \qquad (2)$$

Using the multivariate form of the Taylor theorem, the bias and the variance are approximated by:

$$Bias(x) \approx \frac{1}{2}h^2 \mu_2(K) \Delta f(x) \quad (3)$$

and $$Var(x) \approx n^{-1}h^{-d} R(K) f(x) \quad (4)$$

where $$\mu_2(K) = \int z_1^2 K(z) dz$$

and $R(K) = \int K(z) dz$ are kernel dependent constants, $z_1$ is the first component of the vector z, and ⇁is the Laplace operator.

The tradeoff of bias versus variance can be observed in equations (3) and (4). The bias is proportional to $h^2$, which means that smaller bandwidths give a less biased estimator. However, decreasing h implies an increase in the variance which is proportional to $n^{-1}h^{-d}$. Thus, for a fixed bandwidth estimator, h should be chosen so that an optimal compromise is achieved between the bias and variance over all $x \in R^d$, i.e., minimizes the minimum integrated squared error (MISE):

$$MISE(x) = E \int (\hat{f}(x) - f(x))^2 dx. \quad (5)$$

Nevertheless, the resulting bandwidth formula is of little practical use, since it depends on the Laplacian of the unknown density being estimated.

As noted above, an efficient data-driven methods for bandwidth selection is the "plug-in" rule, which has been proven to be superior to least squares cross validation and biased cross-validation. A practical one-dimensional algorithm based on the plug-in rule method is described below in Section A. For a discussion on the multivariate case, see M. P. Wand, et al., "*Kernel Smoothing*", page 108, London: Chapman & Hall, 1995.

Note that these data-driven bandwidth selectors work well for multimodal data, their only assumption being a certain smoothness in the underlying density. However, the fixed bandwidth affects the estimation performance, by under-smoothing the tails and over-smoothing the peaks of the density. The performance also decreases when the data exhibits local scale variations.

There are known methods for estimating variable bandwidths (e.g., Balloon and Sample Point Estimators). In particular, according to expression (1), the bandwidth h can be varied in two ways. First, by selecting a different bandwidth $h = h(x)$ for each estimation point x, one can define the balloon density estimator $$\hat{f}_1(x) = \frac{1}{nh(x)^d} \sum_{i=1}^n K\left(\frac{x - x_i}{h(x)}\right) \quad (6)$$

In this case, the estimate of f at x is the average of identically scaled kernels centered at each data point.

Second, by selecting a different bandwidth $h = h(x_i)$ for each data point $x_i$, we obtain the sample point density estimator:

$$\hat{f}_2(x) = \frac{1}{n} \sum_{i=1}^n \frac{1}{h(x_i)^d} K\left(\frac{x - x_i}{h(x_i)}\right) \quad (7)$$

for which the estimate of f at x is the average of differently scaled kernels centered at each data point.

While the balloon estimator has more intuitive appeal, its performance improvement over the fixed bandwidth estimator is insignificant. When the bandwidth h(x) is chosen as a function of the k-th nearest neighbor, the bias and variance are still proportional to $h^2$ and $n^{-1}h^{-d}$, respectively. In addition, the balloon estimators usually fail to integrate to one.

The sample point estimators, on the other band, are themselves densities, being non-negative and integrating to one. Their most attractive property is that particular choice of $h(x_i)$ considerably reduces the bias. Indeed, when $h(x_i)$ is taken to be reciprocal to the square root of $f(x_i)$ $$h(x_i) = h_0 \left[\frac{\lambda}{f(x_i)}\right]^{1/2} \quad (8)$$

the bias becomes proportional to $h^4$, while the variance remains unchanged, proportional to $n^{-1}h^{-d}$. In equation (8), $h_0$ represents a fixed bandwidth and 8 is a proportionality constant.

Since $f(x_i)$ is unknown, it has to be estimated from the data. The practical approach is to use one of the methods described in above to find $h_0$ and an initial estimate of the density (called the pilot estimate) of f denoted by $\tilde{f}$. Note that by using $\tilde{f}$ instead of f in equation (8), the nice properties of the sample point estimators in equation (7) remain unchanged. It is known that the method is insensitive to the fine detail of the pilot estimate. The only provision that should be taken is to bound the pilot density away from zero.

The final estimate (equation (7)), however, is influenced by the choice of the proportionality constant 8, which divides the range of density values into low and high densities. When the local density is low, i.e., $\tilde{f}(x_i) < \lambda$, $h(x_i)$ increases relative to $h_0$ implying more smoothing for the point $x_i$. For data points that verify $\tilde{f}(x_i) > \lambda$, the bandwidth becomes narrower.

A good initial choice is to take 8 as the geometric mean of $$\{\tilde{f}(x_i)\}_{i=1 \ldots n}.$$

Experiments have shown that for superior results, a certain degree of tuning is required for 8. Nevertheless, the sample point estimator has been proven to be better than the fixed bandwidth estimator.

One fixed bandwidth method that has been proposed for the detection of modes is the "Mean Shift" method, the efficacy of which has been demonstrated in computer vision problems such as tracking and segmentation (see, e.g., Comaniciu, et al., "Mean Shift: A Robust Approach Toward Feature Space Analysis," IEEE Transactions Pattern Analysis and Machine Intelligence, vol. 24, no. 5. pp. 603–619, 2002; and K. Fukunaga, et. al., "The Estimation of the Gradient of a Density Function," IEEE Trans. Info. Theory, Vol. IT-21, 32–40, 1975).

A limitation of the mean shift procedure is that it involves the specification of a scale parameter. While results obtained appear satisfactory, when the local characteristics of the feature space differs significantly across data, it is difficult to find an optimal global bandwidth for the mean shift procedure.

Based on the above, there is a continuing need for fast and reliable methods for data-driven automatic bandwidth selection for purposes of feature space partitioning and analysis in, e.g., image processing applications.

SUMMARY OF THE INVENTION

The present invention relates generally to a system and method for automatic scale selection for feature space analysis and partitioning in various applications, including, real-time imaging and video processing and computer vision applications. More specifically, the invention relates to a non-parametric variable bandwidth mean shift method that is based on adaptive estimation of a normalized density gradient to accurately detect one or more modes in underlying data and to cluster the data. The invention further relates to a data-driven bandwidth (or scale) selection technique for the variable bandwidth mean shift method, which estimates for each data point the covariance matrix that is the most stable across a plurality of scales.

The methods described herein can be used for, e.g., detecting modes in data and clustering data for various types of data including, but not limited to, image data, video data, speech data, handwriting data, etc. The methods described herein in accordance with the invention may be implemented for various applications including, but not limited to, image segmentation, color segmentation, motion segmentation, speech processing, handwriting processing, OCR (optical character recognition), computer vision, tracking, etc, or any other method or application that is based on feature space analysis and partitioning.

In one aspect of the invention, a method for performing variable bandwidth selection comprises the steps of:

receiving one of image data, video data, speech data and handwriting data, and extracting feature data points from the data;

selecting a plurality of analysis scales;

for each analysis scale, partitioning the data into one or more modes and determining a mean/covariance pair for each mode, wherein each data point is associated with a detected mode and a corresponding mean/covariance pair of the mode for each of the analysis scales;

for each data point, determining the most stable mean/covariance pair associated with the data point; and for each data point, selecting for output the covariance of the most stable mean/covariance pair as a variable bandwidth for the data point, wherein the variable bandwidths are used for analyzing features of the data.

In another aspect, a method for detecting modes in a set of data comprises the steps of:

receiving one of image data, video data, speech data and handwriting data, and extracting feature data points from the data;

determining a bandwidth for each data point; and performing a variable bandwidth mean shift process for each data point using the bandwidth for the data point to detect modes in the data set. In a preferred embodiment, the process of determining a bandwidth for each data point is preferably performed using a data-driven variable bandwidth selection method for determining a local bandwidth (covariance matrix).

These and other objects, features and advantages of the present invention will be described or become apparent from the following detailed description of preferred embodiments, which is to be read in connection with the accompanying drawings.

BRIEF DESCRIPTION OF THE DRAWINGS

FIGS. 2a–c are exemplary diagram of experimental results to compare the results of a fixed bandwidth mean shift process and a variable bandwidth mean shift process, wherein FIG. 2a presents a histogram of the data (n=250), FIG. 2b presents results of the variable bandwidth mean shift and FIG. 2c presents results of the fixed bandwidth mean shift.

FIGS. 4a and 4b are exemplary diagrams illustrating a local mean shift-based scale selection according to the present invention, wherein FIG. 4a depicts a histogram of data comprising n=2000 points and wherein FIG. 4b depicts the normalized mean shift as a function of scale for the points with a positive mean shift.

FIGS. 5a and 5b are exemplary diagrams illustrating a partitioning method using mean shift trajectories according to the invention for variable bandwidth scale selection, wherein FIG. 5a depicts bivariate data comprising 100 points, and wherein FIG. 5b depicts the mean shift trajectory of the data points and the two modes superimposed on the density surface.

FIGS. 8a and 8b are exemplary diagrams illustrating results of a data-driven variable bandwidth selection method according to the invention, wherein FIG. 8a is a histogram of a bimodal data set, and wherein FIG. 8b illustrates a selected bandwidth for each data point.

FIGS. 9a and 9b are further exemplary diagrams illustrating results of a data-driven variable bandwidth selection method according to the invention, wherein FIG. 9a is a histogram of a data set, and wherein FIG. 9b illustrates a selected bandwidth for each data point.

FIGS. 10a and 108b are exemplary diagrams illustrating results of a data-driven variable bandwidth selection method according to the invention, wherein FIG. 10a is a histogram of a bivariate data set, and wherein

FIGS. 11a–11d are exemplary diagrams illustrating results of data driven variable bandwidth selection and clustering methods according to the present invention, analyzing non-linear data structures with multiple scales, wherein FIG. 11a depicts the input data, and wherein FIG. 11b depicts the results of clustering the data using the selected scales for the x coordinates shown in FIG. 11c and using the selected scales for the y coordinates shown in FIG. 11d.

DETAILED DESCRIPTION OF PREFERRED EMBODIMENTS

Figure 1:
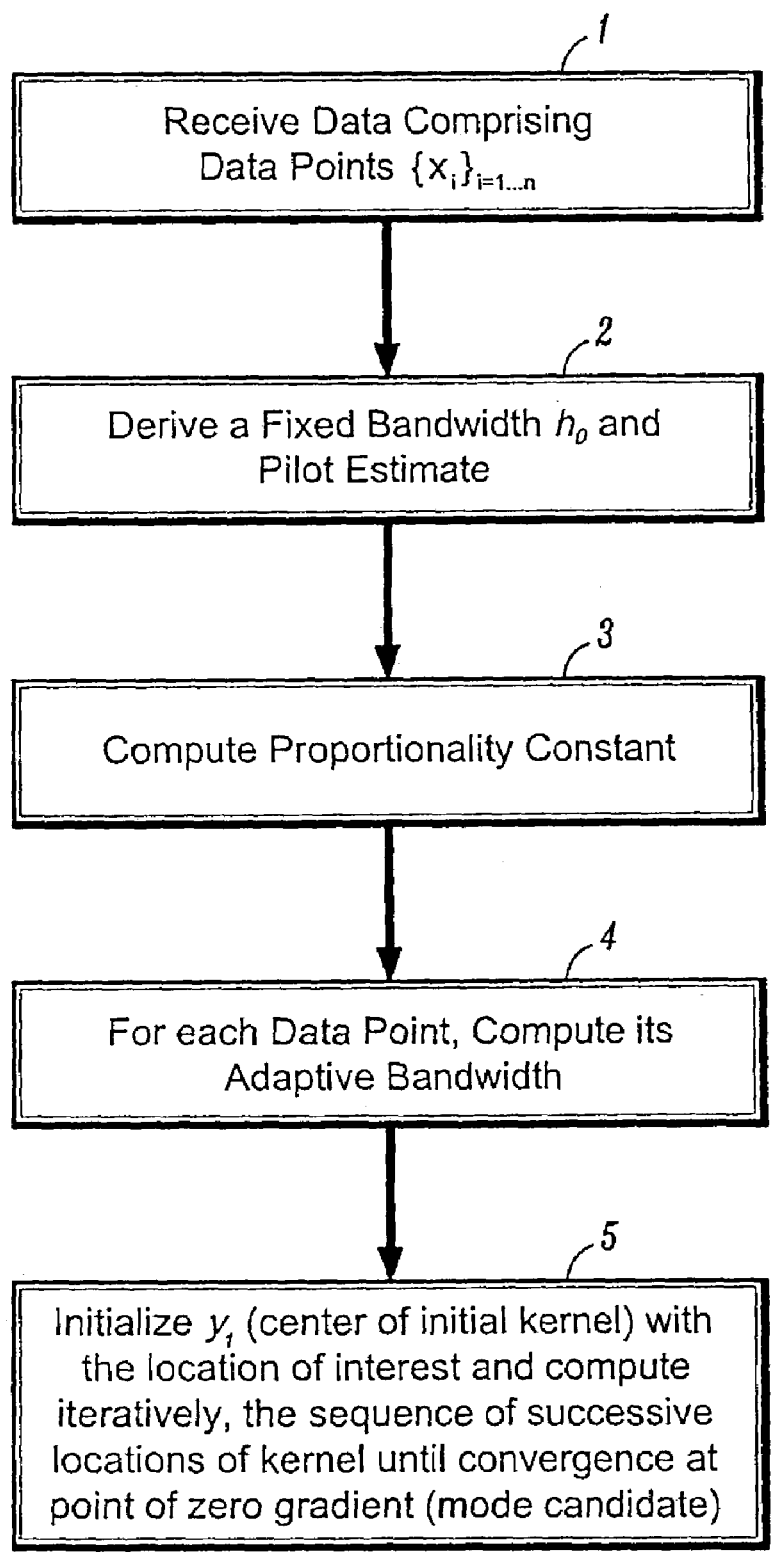
FIG. 1 is a flow diagram of a method for mode detection using a variable bandwidth mean shift according to one aspect of the present invention.

The following detailed description of preferred embodiments is divided into the following sections for ease of reference:

Section 1 discusses Variable Bandwidth Mean Shift (VBMS) methods for feature space partitioning and analysis (e.g., mode detection and data clustering) in complex feature spaces. A VBMS method according to the invention preferably employs an adaptive estimator of the normalized gradient of the density to detect modes in underlying data. In a preferred embodiment, the adaptive estimator is derived from the sample point estimator of equation (7).

Section 2 describes data driven scale selection methods for automatic scale selection and mode detection in a complex feature space. Preferably, a data-driven scale selection method according to the invention performs multi-scale analysis on the data at multiple scales to detect modes associated with the data points. For each data point, the stability of the features (mean, covariance) of the associated mode are tested across the different scales to determine the most stable scale. The local scale of the underlying density is estimated as the bandwidth which maximizes the magnitude of the normalized mean shift vector. Section 2 further describes a method for analyzing complex, multivariate feature space using a data driven scale selection for determining local bandwidths and using a variable-bandwidth mean shift method that employs the local bandwidths to perform mode detection and clustering. Section 2 further presents experimental results for data analysis using the methods described herein.

Section 3 describes autonomous methods for segmenting video data using the scale selection and VBMS methods described herein.

Section 4 describes autonomous methods for providing illumination invariant segmentation of image data using the scale selection and VBMS methods described herein.

Section 5 describes the one dimensional "plug-in" method for bandwidth selection.

Section 6 describes a convergence proof for a VBMS method according to the present invention.

Section 7 describes how the magnitude of the bandwidth normalized mean shift vector m(x; H) is maximized when H is equal to the covariance. In a data-driven bandwidth selection method according to the invention (e.g., section 2), the local scale of the underlying density is estimated as the bandwidth which maximizes the magnitude of the normalized mean shift vector.

Section 8 describes a derivation of an extension of the Jensen-Shannon divergence method according to the present invention, which is used in a data-driven scale selection method of the invention to test the stability of the local bandwidth for a given data point across the scales.

It is to be understood that the systems and methods described herein in accordance with the present invention may be implemented in various forms of hardware, software, firmware, special purpose processors, or a combination thereof. Preferably, the present invention is implemented in software as an application comprising program instructions that are tangibly embodied on one or more program storage devices (e.g., magnetic floppy disk, RAM, CD ROM, ROM and Flash memory), and executable by any device or machine comprising suitable architecture.

It is to be further understood that since the constituent system modules and method steps depicted in the accompanying Figures are preferably implemented in software, the actual connections between the system components (or the flow of the process steps) may differ depending upon the manner in which the present invention is programmed. Given the teachings herein, one of ordinary skill in the related art will be able to contemplate these and similar implementations or configurations of the present invention.

1. Variable Bandwidth Mean Shift

In accordance with one aspect of the invention, an adaptive estimator of the density's normalized gradient is defined from the sample point estimator (equation (7)). The new estimator, which associates to each data point a differently scaled kernel, is the basic step for an iterative procedure which (as demonstrated herein) converges to a local mode of the underlying density, when the kernel obeys some mild constraints. This procedure is referred to herein as the Variable Bandwidth Mean Shift method. Due to its excellent statistical properties, it is anticipated the adaptive estimator will be extensively used in vision applications (and various other applications) that require minimal human intervention.

1(a) Definitions:

To simplify notations, we proceed by introducing first the profile of a kernel K as a function $k:[0,\infty)\to R$ such that $K(x)=k(\|x\|^2)$. We also denote $h_i \eta h(x_i)$ for all $i=1 \ldots n$. Then, the sample point estimator (7) can be written as:

$$\hat{f}_K(x) = \frac{1}{n}\sum_{i=1}^{n} \frac{1}{h_i^d} k\left(\left\|\frac{x-x_i}{h_i}\right\|^2\right) \tag{9}$$

where the subscript K indicates that the estimator is based on kernel K.

A natural estimator of the gradient of f is the gradient of $$\hat{f}_K(x)$$

$$\hat{\nabla} f_K(x) \equiv \nabla \hat{f}_K(x) = \frac{2}{n} \sum_{i=1}^{n} \frac{x - x_i}{h_i^{d+2}} k'\left(\left\|\frac{x - x_i}{h_i}\right\|^2\right)$$

$$= \frac{2}{n} \sum_{i=1}^{n} \frac{x_i - x}{h_i^{d+2}} g\left(\left\|\frac{x - x_i}{h_i}\right\|^2\right)$$

$$= \frac{2}{n} \left[ \sum_{i=1}^{n} \frac{1}{h_i^{d+2}} g\left(\left\|\frac{x - x_i}{h_i}\right\|^2\right) \right] \times \underbrace{\left[ \frac{\sum_{i=1}^{n} \frac{x_i}{h_i^{d+2}} g\left(\left\|\frac{x - x_i}{h_i}\right\|^2\right)}{\sum_{i=1}^{n} \frac{1}{h_i^{d+2}} g\left(\left\|\frac{x - x_i}{h_i}\right\|^2\right)} - x \right]}_{\text{variable bandwidth mean shift vector}}$$

(10)

where we denoted $$g(x) = -k'(x) \quad (11)$$

and assumed that the derivative of profile k exists for all $x \in [0, \infty)$ except for a finite set of points.

The last bracket in equation (10) represents the variable bandwidth mean shift vector $$M_v(x) \equiv \frac{\sum_{i=1}^{n} \frac{x_i}{h_i^{d+2}} g\left(\left\|\frac{x - x_i}{h_i}\right\|^2\right)}{\sum_{i=1}^{n} \frac{1}{h_i^{d+2}} g\left(\left\|\frac{x - x_i}{h_i}\right\|^2\right)} - x \quad (12)$$

To see the significance of expression (12), we define first the kernel G as $$G(x) = Cg(\|x\|^2) \quad (13)$$

where C is a normalization constant that forces G to integrate to one.

Then, by employing equation (8), the term that multiplies the mean shift vector in equation (10) can be written as:

$$\frac{2}{n} \left[ \sum_{i=1}^{n} \frac{1}{h_i^{d+2}} g\left(\left\|\frac{x - x_i}{h_i}\right\|^2\right) \right] = \frac{2}{C} \left[ \frac{\sum_{i=1}^{n} \tilde{f}(x_i)}{n \lambda h_0^2} \right] \hat{f}_G(x) \quad (14)$$

where $$\hat{f}_G(x) \equiv C \frac{\sum_{i=1}^{n} \tilde{f}(x_i) \frac{1}{h_i^d} g\left(\left\|\frac{x - x_i}{h_i}\right\|^2\right)}{\sum_{i=1}^{n} \tilde{f}(x_i)} \quad (15)$$

is nonnegative and integrates to one, representing an estimate of the density of the data points weighted by the pilot density values $\tilde{f}(x_i)$ Finally, by using equations (10), (12), and (14), it results that:

$$M_v(x) = \frac{\lambda}{n^{-1} \sum_{i=1}^{n} \tilde{f}(x_i)} \frac{h_0^2}{2/C} \frac{\hat{\nabla} f_K(x)}{\hat{f}_G(x)}. \quad (16)$$

Equation (16) represents a generalization of the fixed bandwidth mean shift equation, $$M(x) = \frac{h^2}{2/C} \frac{\hat{\nabla} f_K(x)}{\hat{f}_G(x)},$$

and shows that the adaptive bandwidth mean shift is an estimator of the normalized gradient of the underlying density.

The proportionality constant, however, depends on the value of 8. When 8 is increased, the norm of the mean shift vector also increases. On the other hand, a small value for 8 implies a small ψM,ψ. As demonstrated herein, due to this external variability of the mean shift norm, the convergence property of an iterative procedure according to one embodiment of the present invention based on the variable bandwidth mean shift is remarkable. Note also that when 8 is taken equal to the arithmetic mean of $$\{\tilde{f}(x_i)\}_{i=1 \ldots n},$$

the proportionality constant becomes as in the fixed bandwidth case.

1(b) Properties of the Adaptive Mean Shift

Equation (12) shows an attractive behavior of the adaptive estimator. The data points lying in large density regions affect a narrower neighborhood since the kernel bandwidth $h_i$ is smaller, but are given a larger importance, due to the weight $1/h_i^{d+2}$. In contrast, the points that correspond to the tails of the underlying density are smoothed more and receive a smaller weight. The extreme points (outliers) receive very small weights, being thus automatically discarded. Recall that the fixed bandwidth mean shift associates the same kernel for each data point.

An important property of the adaptive estimator is the convergence associated with its repetitive computation. In other words, if we define a mean shift procedure recursively as the evaluation of the mean shift vector $M_v(x)$ followed by the translation of the kernel G by $M_v(x)$, this procedure leads to a local mode in the underlying density. More specifically, as demonstrated below, this mode represents a local maximum of the sample point estimator of equation (9). Thus, the superior performance of the sample point estimator translates into superior performance for the adaptive mean shift.

We denote by $$\{y_j\}_{j=1,2...}$$

the sequence of successive locations of the kernel G, where:

$$y_{j+1} = \frac{\sum_{i=1}^{n} \frac{x_i}{h_i^{d+2}} g\left(\left\|\frac{y_j - x_i}{h_i}\right\|^2\right)}{\sum_{i=1}^{n} \frac{1}{h_i^{d+2}} g\left(\left\|\frac{y_j - x_i}{h_i}\right\|^2\right)}, j = 1, 2, \ldots \quad (17)$$

is the weighted mean at $y_j$ computed with kernel G and weights $1/h_i^{d+2}$, and $y_1$ is the center of the initial kernel. The density estimates computed with kernel K in the points (17) are:

$$\hat{f}_K = \{\hat{f}_K(j)\}_{j=1,2...} \equiv \{\hat{f}_K(y_j)\}_{j=1,2...} \quad (18)$$

In Section 6 below, it is demonstrated that if the kernel K has a convex and monotonic decreasing profile and the kernel G is defined according to equations (11) and (13), the sequences of equations (17) and (18) are convergent. This means that the mean shift procedure, initialized at a given location, converges at a nearby point where the estimator of equation (9) has zero gradient. In addition, since the modes of the density are points of zero gradient, it results that the convergence point is a mode candidate.

An advantage of using the mean shift rather than the direct computation of (9) followed by a search for local maxima is twofold. First, the overall computational complexity of the mean shift is much smaller that that of the direct method and the mean shift does not need an underlying lattice for the computations. In contrast, the direct search for maxima of the density function needs a regular lattice and requires a number of density function evaluations that increases exponentially with the space dimension. Second, for many applications, we only need to know the mode associated with a reduced set of data points. In this case, the mean shift procedure becomes a natural process that follows the trail to the local mode.

Referring now to FIG. 1, a flow diagram illustrates a method for mode detection using a variable bandwidth mean shift according to one aspect of the present invention. More specifically, FIG. 1 depicts an iterative procedure for mode detection based on the variable bandwidth mean shift in a one-dimensional space.

First, given a set of data points $\{x_i\}_{i=1,\ldots,n}$ (step 1), a fixed bandwidth $h_0$ is derived using the one-dimensional rule (Section 5) and a pilot estimate $\tilde{f}$ is determined using equation (1) with $h=h_0$ (step 2). Then, the proportionality constant is determined as log $$\lambda = n^{-1} \sum_{i=1}^{n} \log \tilde{f}(x_i)$$

(step 3). Then, for each data point $x_i$, an adaptive bandwidth is computed by $$h(x_i) = h_0 [\lambda/\tilde{f}(x_i)]^{1/2}$$

(step 4). Then, initialize $y_1$ with the location of interest and compute iteratively using equation (17) until convergence (step 5). The convergence point is a point of zero gradient, hence, a mode candidate.

In another embodiment of the present invention, a multidimensional model for the Variable Bandwidth Mean Shift with fully parameterized bandwidth matrices is provided. In particular, we generalize the derivations presented above for the case when a fully parameterized matrix $H_i$ is given for each data point $x_i$. The matrix $H_i$ quantifies the uncertainty associated with $x_i$. In accordance with the present invention, a sample point estimator with a d-variate normal kernel is given by:

$$\hat{f}_v(x) = \frac{1}{n(2\pi)^{d/2}} \sum_{i=1}^{n} \frac{1}{|H_i|^{1/2}} \exp\left(-\frac{1}{2} d^2(x, x_i, H_i)\right) \quad (19)$$

Let $H_h$ be the data-weighted harmonic mean of the bandwidth matrices computed at x:

$$H_h^{-1}(x) = \frac{\sum_{i=1}^{n} \frac{H_i^{-1}}{|H_i|^{1/2}} \exp\left(-\frac{1}{2} d^2(x, x_i, H_i)\right)}{\sum_{i=1}^{n} \frac{1}{|H_i|^{1/2}} \exp\left(-\frac{1}{2} d^2(x, x_i, H_i)\right)} \quad (20)$$

An estimator of the gradient of the true density is the gradient of $\hat{f}_v$:

$$\hat{\nabla} f_v(x) \equiv \nabla \hat{f}_v(x) = \frac{1}{n(2\pi)^{d/2}} \sum_{i=1}^{n} \frac{H_i^{-1}(x_i - x)}{|H_i|^{1/2}} \exp\left(-\frac{1}{2} d^2(x, x_i, H_i)\right) \quad (21)$$

By multiplying (21) to the left with $H_h(x)$ and using (19), it results that:

$$\hat{H}_h(x) \nabla f_v(x) = \hat{f}_v(x) m_v(x) \quad (22)$$

where $$m_v(x) \equiv \frac{\sum_{i=1}^{n} \frac{H_i^{-1}}{|H_i|^{1/2}} \exp\left(-\frac{1}{2}d^2(x, x_i, H_i)\right)}{\sum_{i=1}^{n} \frac{H_i^{-1}}{|H_i|^{1/2}} \exp\left(-\frac{1}{2}d^2(x, x_i, H_i)\right)} - x \quad (23)$$

is the variable-bandwidth mean shift vector. Note that in definition (23) we used the notation $B^{-1}A\eta A/B$ for any two square, nonsingular matrices A and B. Finally, from (22), we have:

$$m_v(x) = H_h(x)\frac{\hat{\nabla} f_v(x)}{\hat{f}_v} \quad (24)$$

which shows that the variable-bandwidth mean shift vector is an estimator of the normalized gradient of the underlying density.

If the bandwidth matrices $H_i$ are all equal to a fixed matrix H, the sample point estimator (19) reduces to the simple multivariate density estimator with normal kernel $$\hat{f}(x) = \frac{1}{n|2\pi H|^{1/2}} \sum_{i=1}^{n} \exp\left(-\frac{1}{2}d^2(x, x_i, H)\right) \quad (25)$$

The gradient estimator is in this case:

$$\hat{\nabla} f(x) \equiv \nabla \hat{f}(x) = \frac{H^{-1}}{n|2\pi H|^{1/2}} \sum_{i=1}^{n} (x_i - x)\exp\left(-\frac{1}{2}d^2(x, x_i, H)\right) \quad (26)$$

and the equation (24) becomes:

$$m(x) = H\frac{\hat{\nabla} f(x)}{\hat{f}(x)} \quad (27)$$

where $$m(x) \equiv \frac{\sum_{i=1}^{n} x_i \exp\left(-\frac{1}{2}d^2(x, x_i, H)\right)}{\sum_{i=1}^{n} \exp\left(-\frac{1}{2}d^2(x, x_i, H)\right)} - x \quad (28)$$

is the fixed bandwidth mean shift vector.

1(c) Performance Comparison

We compared the variable and fixed bandwidth mean shift algorithms for various multimodal data sets that exhibited also scale variations. The fixed bandwidth procedure was run with a bandwidth $h_0$ derived from the plug-in rule given in Section 5.

The plug-in rule was developed for density estimation and since here we are concerned with density gradient estimation, it is preferable to use a larger bandwidth to compensate for the inherently increased sensitivity of the estimation process. We have modified the plug-in rule by halvening the contribution-of the variance term. This change was maintained for experiments presented in this disclosure. The constant 8 of the adaptive procedure was kept as the geometric mean of $$\{\tilde{f}(x_i)\}_{i=1\ldots n}$$

Figure 2A:
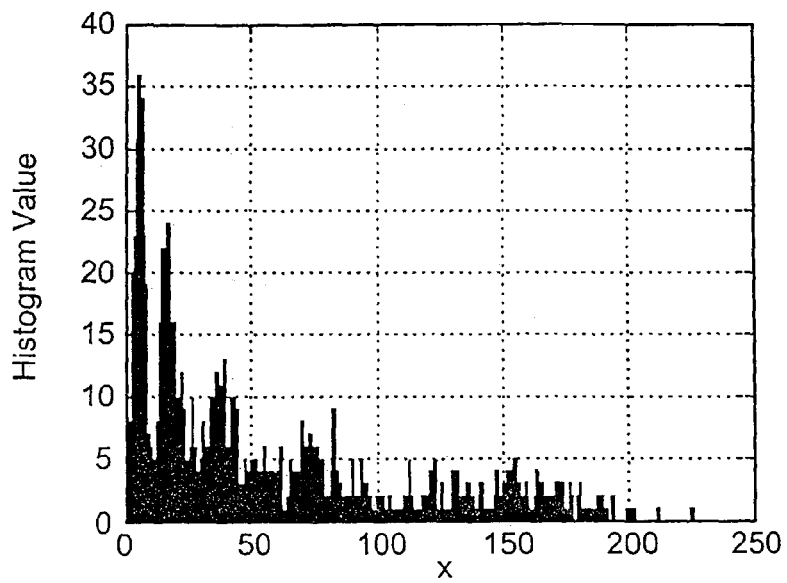
Figure 2B:
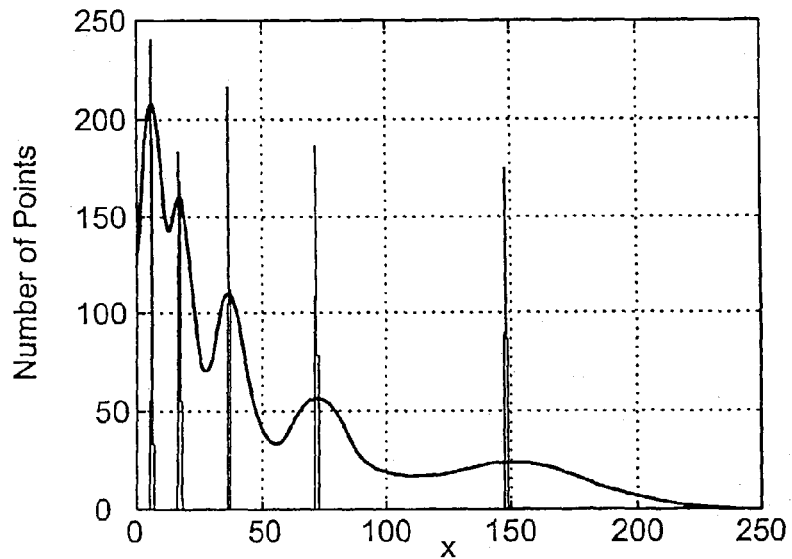
Figure 2C:
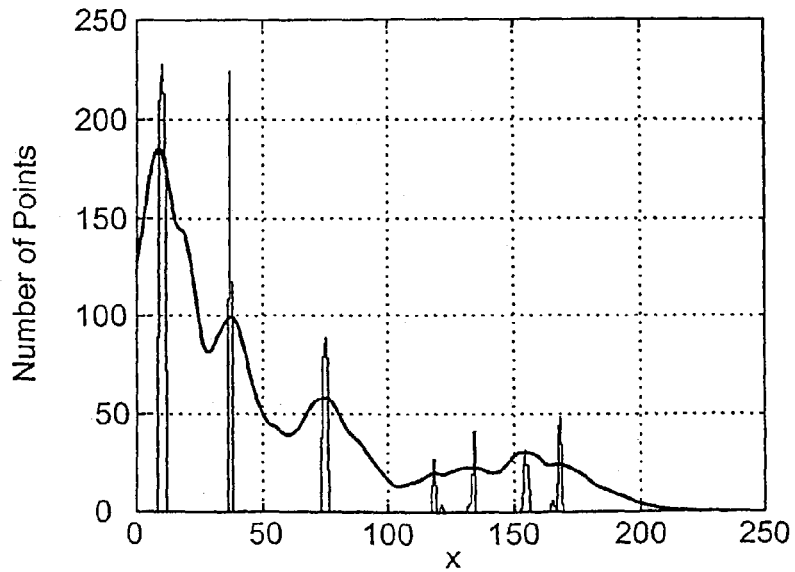

FIGS. 2a, 2b and 2c are exemplary diagrams comparing experimental results of a fixed bandwidth mean shift process and a variable bandwidth mean shift process. FIG. 2a presents a histogram of the data (n=250), FIG. 2b presents results of the variable bandwidth mean shift and FIG. 2c presents results of the fixed bandwidth mean shift.

As can be gleaned from FIGS. 2a–c, the fixed bandwidth shift resulted in good performance for the locations where the local scale was in the medium range. However, the very narrow peaks were fused, while the tails were broken into pieces. In contrast, the adaptive algorithm resulted in superior performance, by choosing a proper bandwidth for each data point.

2. Data-Driven Scale Selection

The previous Section 1 followed purely nonparametric ideas, since no formal structure was assumed about the data. Implying only a certain smoothness of the underlying density we used available algorithms for scale selection to derive an initial bandwidth $h_0$. The criterion for bandwidth selection was a global measure (MISE), hence, $h_0$ achieved an optimal compromise between the integrated squared bias and the integrated variance. Then, we modified this bandwidth for each data point, according to the local density.

The analysis of visual features, for example, often requires nonparametric techniques with locally adaptive bandwidths. Accurate results are obtained when each data point is characterized by a bandwidth matrix that quantifies local uncertainty. For this scenario, the variable-bandwidth mean shift technique discussed above yields superior feature space partitioning and analysis.

In most scenarios, however, the uncertainty of data points is not known a priori and has to be estimated from the data. In this section, according to another embodiment of the invention, we present a mean shift-based approach for local bandwidth selection in the multimodal, multivariate case. This method is essentially based on a fundamental property of normal (Guassian) distributions regarding the bias of the normalized density gradient. It is demonstrated that within the large sample approximation, the local covariance of the underlying distribution is estimated by the matrix that maximizes the magnitude of the normalized mean shift vector. By imposing a local structure on the data and exploiting the mean shift trajectory, a reliable algorithm according to the invention is described that takes into account the stability of local bandwidth estimates across scales. The validity of the theoretical results is proven in various experiments described herein.

In this application, we present a new and effective approach to local bandwidth selection for multimodal and multivariate data. The goal is to estimate for each data point the covariance matrix which is the most stable across scales. This matrix will be taken as the local bandwidth of the point in question and further used in the variable-bandwidth mean shift.

The motivation of a local bandwidth selection method according to the invention is given in Section 2(A). Section 2(B) presents a theoretical criterion for bandwidth selection, based on the normalized mean shift vector. Section 2(C) discusses details of a local bandwidth selection method according to an embodiment of the invention and presents the results of bandwidth selection experiments using such method. In Section 2(D), we apply the variable-bandwidth mean shift to decompose multi-scale non-linear data. Discussions are presented in Section 2(E).

2(A) Motivation

A goal of variable-bandwidth density estimation is to improve the performance of kernel estimators by adapting the kernel bandwidth to the local data statistics. As noted above, sample point density estimators are of particular interest since their estimation bias decreases in comparison to the fixed bandwidth estimators, while the covariance remains the same. Only recently have these density estimators have been used for vision purposes. The variable bandwidth mean shift method algorithm discussed herein provides a solution for mode detection in complex feature spaces. Variable-bandwidth density estimation has been applied for histogram construction from color variants (see T. Gevers, "Robust Histogram Construction From Color Invariants", In *Proceedings International Conference on Computer Vision*, Vancouver, Canada, Vol. 1, pages 615–620, July 2001.) Although theoretically promising, variable-bandwidth methods rely heavily on the selection of local bandwidths.

Recall that in the general framework of unsupervised analysis, most of the parameters (including the kernel bandwidth) must be estimated directly from the data. In accordance with the present invention, we only assume that the range of scales at which structures appear in the data is known. In almost all vision scenarios, for example, this information is available from prior geometric, camera, or dynamical constraints. A preferred solution for scale selection according to the present invention is to perform multi-scale analysis in the given scale range and to locally test the stability of the first and second order statistical properties of the data. This solution recognizes the importance of analysis at multiple scales. At the same time, the solution stresses the importance of measurements in local neighborhoods and the inability of global measures to deal with non-homogeneous data.

Figure 3:
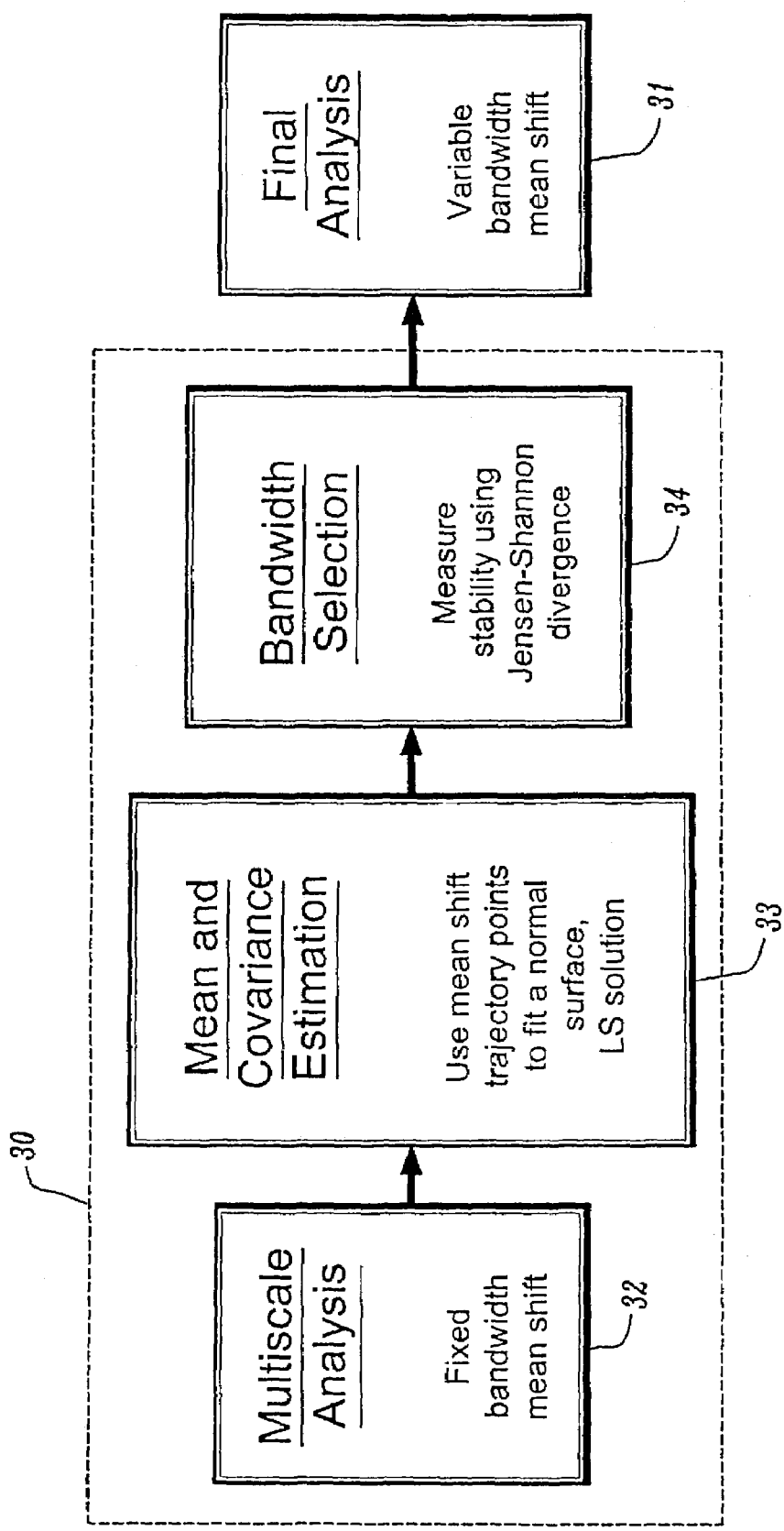
FIG. 3 is a block diagram of a system and method for variable bandwidth selection and mode detection according to an embodiment of the present invention.

FIG. 3 is a block diagram of a system and method for local bandwidth selection and feature space analysis according to an embodiment of the present invention. In general, the system comprises a variable bandwidth selection module 30 for selecting optimal bandwidths which are used in module 31 for performing a VBMS procedure according to the present invention. In general, module 32 performs multi-scale analysis on the underlying data space by applying the fixed bandwidth mean shift procedure with different analysis scales. In module 33, trajectory points and the mean shift vectors are used to fit a normal surface to the density of each identified structure. For each data point, module 34 determines and selects the most stable covariance matrix (associated with the data point) across the different scales. Finally, in module 31, the covariance matrices are used in the variable-bandwidth mean shift for feature space analysis and partition. A more detailed description of the function of each of the system modules in FIG. 3 is provided below.

In general, a data-driven variable bandwidth selection method according to one aspect of the present invention is as follows. For a given analysis scale, each data point is associated with a local structure. When the analysis is performed at multiple scales, the point is associated with a set of local structures whose feature properties it inherits. A new technique involving the mean shift trajectories is exploited at this stage to estimate the true mean and covariance matrix of each local structure. The stability of these features is then checked across scales to determine the most relevant scale using a specialized version of the Jensen-Shannon divergence according to the present invention.

For covariance matrix computation, we exploit a fundamental property of the normalized gradient of normal distributions, whose estimate has been proven to be proportionally downward biased. The direct consequence of this property is that, within the large sample approximation, the estimation bias can be canceled, allowing the estimation of the true local covariance of the underlying distribution. We show that the local covariance is estimated by the matrix which maximizes the magnitude of the normalized mean shift vector. Although this property imposes a local, parametric structure on the data, note that the overall technique of the invention maintains a nonparametric nature. The data partitioning for each analysis scale is achieved through fixed-bandwidth mean shift iterations.

The last step of the overall algorithm involves the variable-bandwidth mean shift process, which makes use of the previously determined bandwidth matrices. Thus, the data-driven scale selection technique benefits from a reliable bandwidth selection, while maintaining the ability of analyzing complex, non-normal structures.

2(B) Criterion for Bandwidth Selection

After the introduction of the main notations, this section presents a property of the normalized density gradients that will be used as a basic criterion in estimating the scale.

2(B)(i) Notations

Given n data points $x_i, i=1 \ldots n$ in the d-dimensional space $R^d$, the multivariate kernel density estimator with kernel K(x) and a symmetric positive definite d×d bandwidth matrix H, computed at the point x is given by:

$$\hat{f}(x) = \frac{1}{n} \sum_{i=1}^{n} K_H(x - x_i) \quad (29)$$

where $$K_H(x) = |H|^{-1/2} K(H^{-1/2} x) \quad (30)$$

The d-variate kernel K, is a bounded function that has compact support and integrates to one. Preferably, K is taken as the standard d-variate normal density:

$$K(x) = \frac{1}{(2\pi)^{d/2}} \exp\left(-\frac{1}{2} \|x\|^2\right) \quad (31)$$

which implies that $K_H(x-x_i)$ is the $N(x_i, H)$ density. H is referred to herein as analysis bandwidth. For notation convenience let:

$$d^2(x, x_i, H) \equiv (x - x_i)^T H^{-1} (x - x_i) \quad (32)$$

be the Mahalanobis distance from x to $x_i$. The estimator (29) becomes:

$$\hat{f}(x) = \frac{1}{n|2\pi H|^{1/2}} \sum_{i=1}^{n} \exp\left(-\frac{1}{2}d^2(x, x_i, H)\right) \quad (33)$$

We will also need the fixed-bandwidth mean shift vector $$m(x) \equiv \frac{\sum_{i=1}^{n} x_i \exp\left(-\frac{1}{2}d^2(x, x_i, H)\right)}{\sum_{i=1}^{n} \exp\left(-\frac{1}{2}d^2(x, x_i, H)\right)} - x \text{ to be equal to} \quad \text{(equation (28))}$$

$$m(x) = H\frac{\hat{\nabla} f(x)}{\hat{f}(x)}. \quad \text{(equation (27))}$$

2(B)(ii) Bandwidth Selection Theorem

We assume that locally the underlying distribution the point x is multivariate normal with unknown mean μ and covariance matrix E. The parametric bandwidth selection requires the estimation of E, a difficult talk at first sight. Indeed, to locally fit a normal to the multimodal data, one needs a priori knowledge of the neighborhood size in which the fitting parameters are to be estimated. If the estimation is performed for several neighborhood sizes, a scale invariant measure of the goodness of fit is needed.

In accordance with the present invention, however, the following theorem presents an elegant solution to such problem. The following theorem is valid when the number of available samples is large.

Theorem 1: If the true distribution f is N(μ, E) and the fixed-bandwidth mean shift is computed with a normal kernel $K_H$, then, the bandwidth normalized norm of the mean shift vector is maximized when the analysis bandwidth H is equal to E.

Proof: Since the true distribution f is normal with covariance matrix E, it follows that the mean of f̂(x),E[f̂(x)]=φ(x;Σ+H) is also a normal surface with covarianceΣ+ H. Likewise, since the gradient is a linear operator, using equation (26), we have E[∇f̂(x)]=∇φ(x;Σ+H). We assume that the large sample approximation is valid, i.e., the variances of the means are relatively small. By employing $$m(x) = H\frac{\hat{\nabla} f(x)}{\hat{f}(x)},$$

this implies that:

$$\text{plim } m(x) = H\frac{E[\nabla \hat{f}(x)]}{E[\hat{f}(x)]} \quad (34)$$

$$= H\frac{\nabla \phi(x; \sum + H)}{\phi(x; \sum + H)}$$

$$= -H\left(\sum + H\right)^{-1}(x - \mu)$$

where plim denotes probability limit with H held constant.

The norm of the bandwidth normalized mean shift is given by $$m(x; H) \equiv \|H^{-1/2} \text{plim } m(x)\| \equiv \left\|H^{1/2}\left(\sum + H\right)^{-1}(x - \mu)\right\| \quad (35)$$

It is demonstrated in Section 7 below that the magnitude of the bandwidth normalized mean shift vector m(x; H) is maximized when H=E.

Figure 4A:
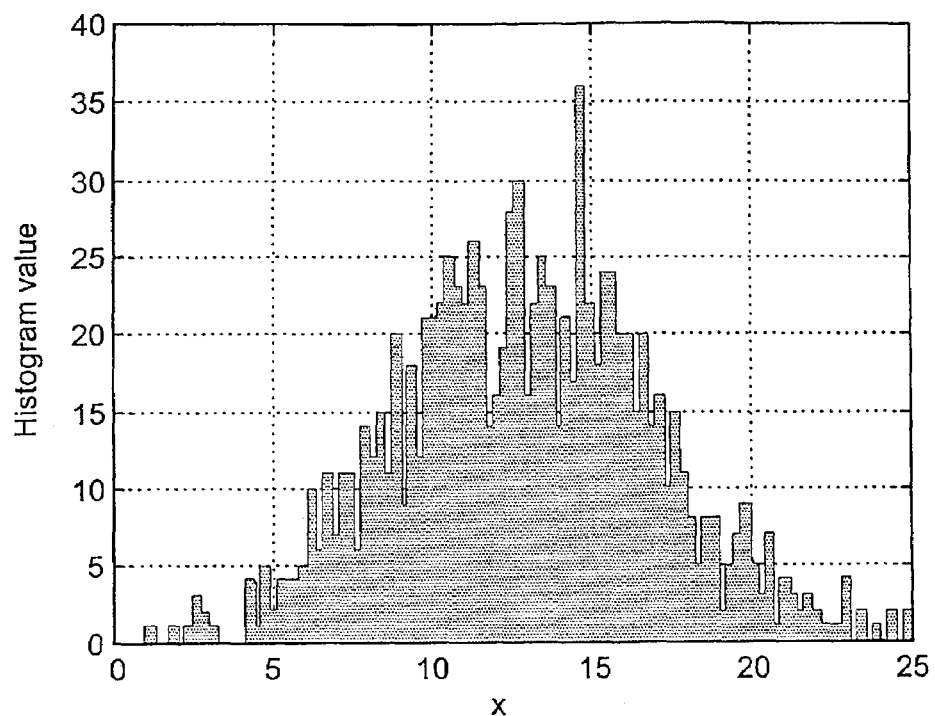
Figure 4B:
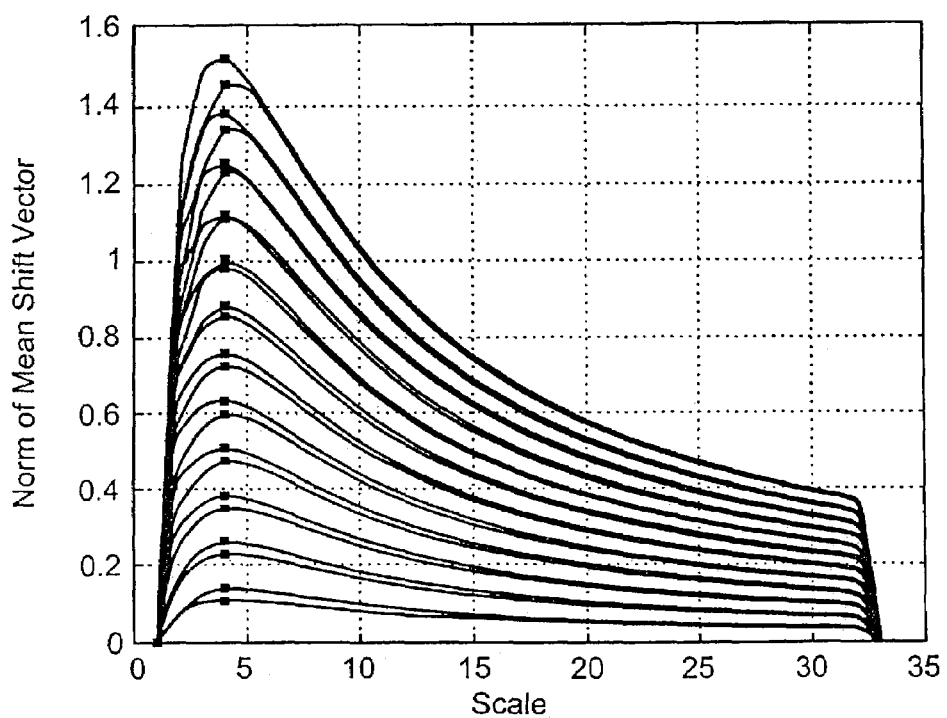

Theorem 1 above leads to an interesting scale selection criterion: the underlying distribution has the local covariance equal to the analysis bandwidth H that maximizes the magnitude of the normalized mean shift vector. The scale selection process would involve the maximization of m(x; H) across the space of symmetric and positive definite matrices H. The main idea of this property is underlined in FIGS. 4a and 4b. FIG. 4a illustrates a histogram of the input data of n=2000 points with N(10,4). The bandwidth normalized mean shift vectors associated with the points shown in FIG. 4a are represented as a function of scale in FIG. 4b. The upper curves correspond to the points located far from the mean. The curves are maximized for $h_0$=4. Note the accurate local scale indication by the maxima of the curves.

2(C) Algorithm for Bandwidth Selection

This section describes methods for (i) determining trajectories of the mean shift procedure, (ii) determining a covariance matrix using a least squares solution; and (iii) determining the stability of the bandwidth selection process using a method based on the Jensen-Shannon divergence. In addition, a method for bandwidth selection according to an embodiment of the present invention is described with reference to FIG. 7, and experimental results are presented in FIGS. 8–11 illustrating the advantages of the present invention.

2(C)(i) Mean Shift Trajectories

Section 2(B)(ii) set forth the theoretical framework for bandwidth selection by assuming that, locally, the underlying distribution is normal. In practice, however, the input data is multi-modal with asymmetric structures, while neighboring structures might contaminate each other. Therefore, a robust decision should be based not only on point information (i.e., the normalized mean shift vector of data point x), but also on information associated with the underlying structure to which the data point belongs. This information is of more global nature and is preferably computed using mean shift trajectories.

Figure 5A:
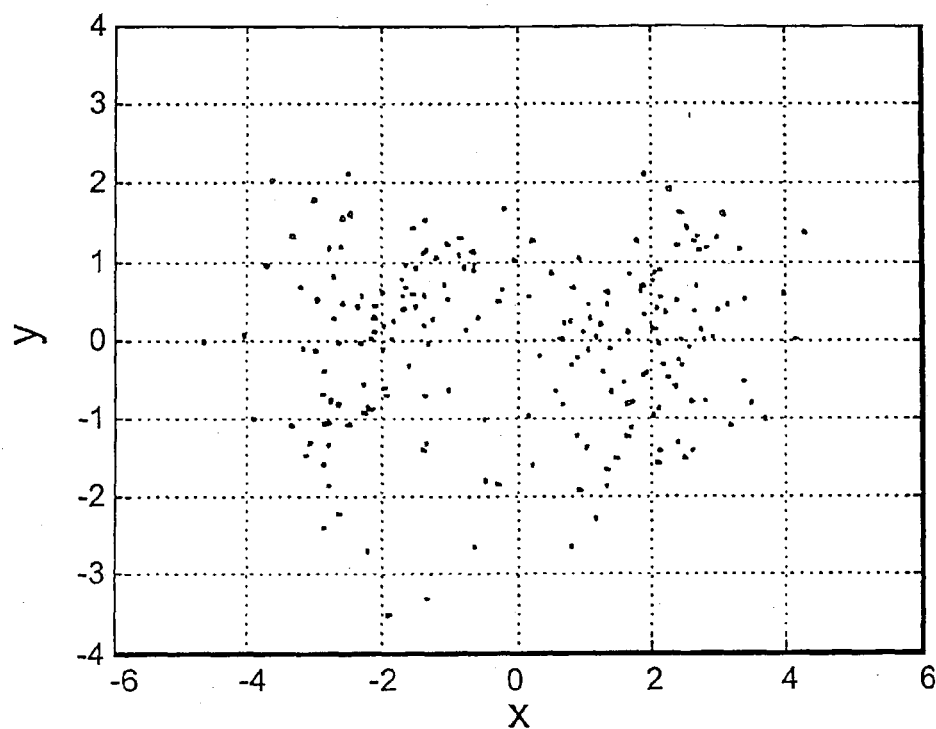
Figure 5B:
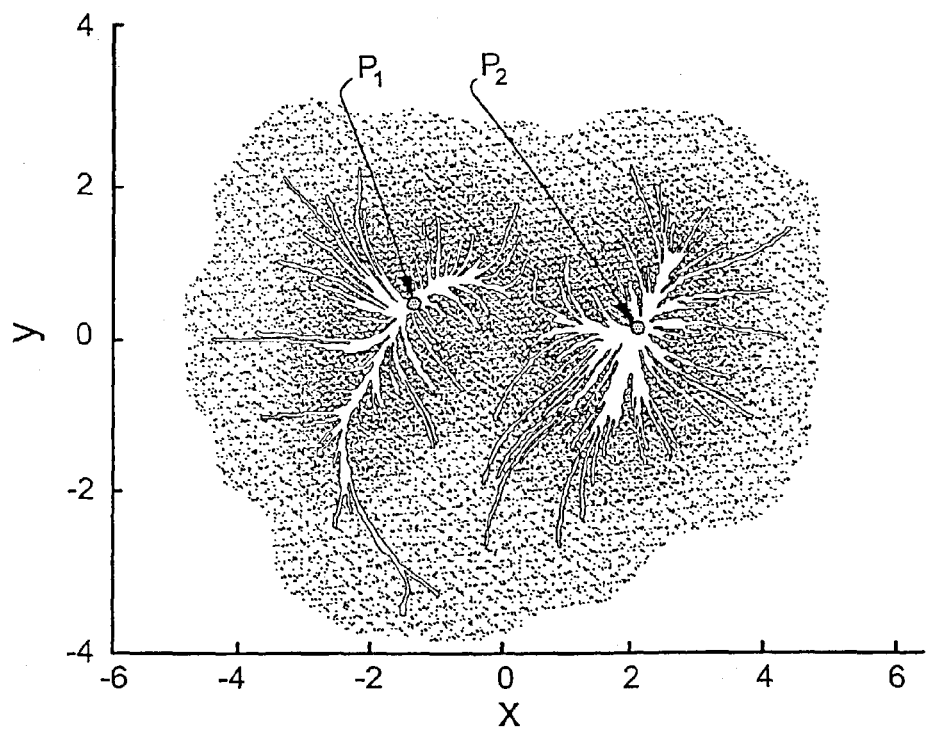

Recall that a mode seeking algorithm can be obtained by exploiting the mean shift vector (equation (27)). The iterative computation of m(x) followed by the translation of the kernel $K_H(x)$ by m(x)converges to a nearby location where the density estimate has zero gradient. As an example, FIG. 5b illustrates trajectories of the mean shift procedure applied to the data points shown in FIG. 5a. As indicated in FIG. 5b, two modes are identified (P1 and P2) and the data is partitioned into two structures by grouping together all the trajectories which converged to the same mode. The decomposition depends on the analysis bandwidth H.

2(C)(ii) Least Squares Solution

Let us denote by $x_i$,i=1 . . . $n_u$ all the data points associated with the u-th mode and by $y_i$,i=1 . . . $t_u$ the location of all trajectory points associated with the same mode. The partitioning is obtained using the mean shift procedure with analysis bandwidth H. Assume that (μ, E) are the mean and covariance of the underlying structure.

The mean and covariance of the points $x_i, i=1 \ldots n_u$ are not reliable estimates of $(\mu, E)$. The reason is that the data partitioning is nonparametric, based on the peaks and valleys of the density probability function of the entire data set. As a result, the set $x_i, i=1 \ldots n_u$ is an incomplete sample from the local underlying distribution. It can be asymmetric (depending on the neighboring structures) and it might not contain the tail. Hence, the sample mean and variance differ from $(\mu, E)$.

Figure 6:
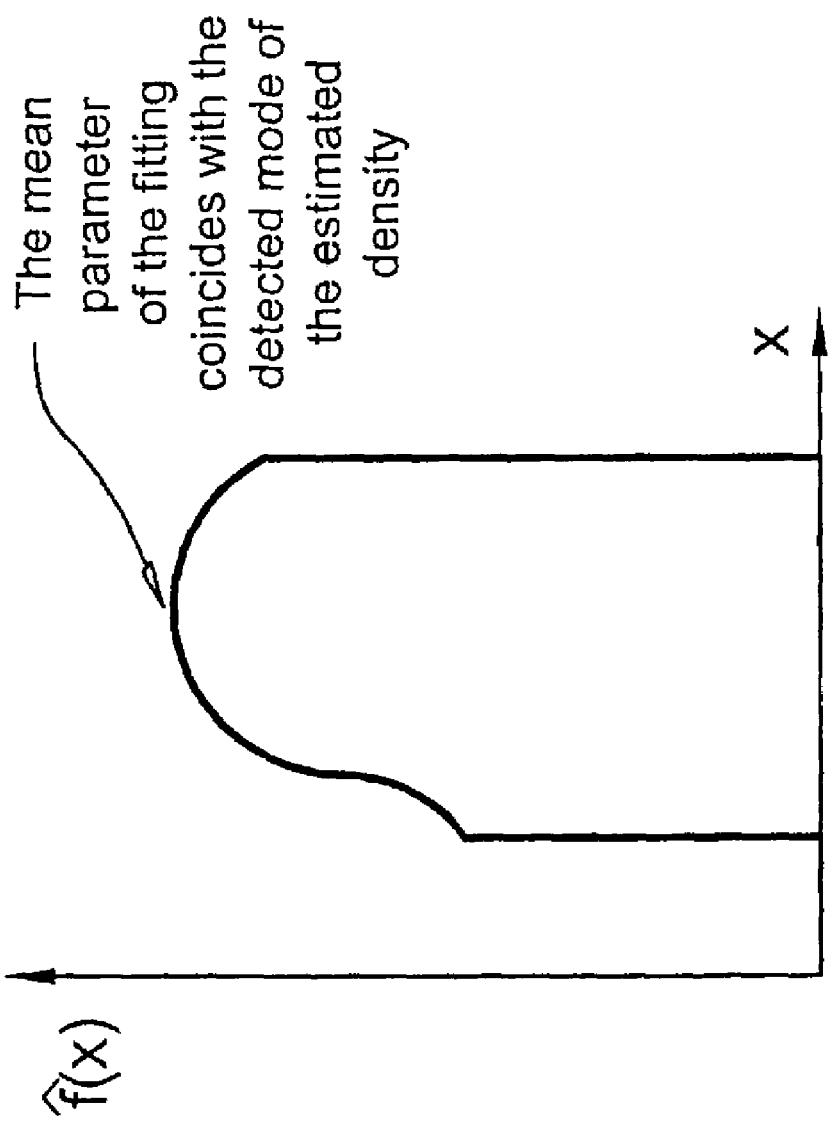
FIG. 6 is an exemplary diagram illustrating a method according to the present invention for fitting a normal surface to density values computed in trajectory points.

In accordance with the present invention, a solution is to fit a normal surface to the density values computed in the trajectory points associated with the mode. More specifically, the fitting is performed using the mean shift vector. Indeed, for each trajectory point $y_i$ we apply equation (34) to obtain:

$$m(y_i) = -H\left(\sum + H\right)^{-1}(y_i - \mu) \tag{36}$$

where $(\mu, E)$ are the mean and covariance of the true distribution. By fixing the mean $\mu$ as the local peak in the density surface (see FIG. 6), we can derive a least squares solution for the covariance matrix.

If $H=h^2 I$ and $E=\Phi^2 I$, (where I is the identity matrix) the least squares solution for $\Phi^2$ is $$\sigma^2 = h^2 \left[ \frac{\sum_{i=1}^{tu} m_i^T(\mu - y_i)}{\sum_{i=1}^{tu} \|m_i\|^2} - 1 \right] \tag{37}$$

Observe that the quantity (37) is always positive, since the norm of the mean shift vector is always smaller than the distance to the mode.

$$\text{If } H = diag[h_1^2 \ldots h_d^2] \text{ and } \sum = diag[\sigma_1^2 \ldots \sigma_d^2], \text{ then} \tag{38}$$

$$\sigma_v^2 = h_v^2 \left[ \frac{\sum_{i=1}^{tu} m_{iv}^T(\mu_v - y_{iv})}{\sum_{i=1}^{tu} m_{iv}^2} - 1 \right]$$

where the subindex $v=1 \ldots d$ denotes the v-th component of a vector.

Although a fully parameterized covariance matrix can be computed using equation (36), this is not necessarily advantageous, and for dimensions $d>2$ the number of parameters introduced are too large to make reliable decisions. Therefore, in a preferred embodiment, equations (37) and (38) are used.

2(C) (iii) Multi-scale Analysis

When the underlying data distribution is normal, the analysis bandwidth H does not influence the computation of $(\mu, E)$. When the underlying data structure deviates from normality, H affects the estimation. Therefore, in the final step of the scale selection process, the stability of $(\mu, E)$ is tested against the variation of the analysis bandwidth. In one embodiment, the test comprises taking $H=h^2 I$ and varying h on a logarithmic scale with constant step.

Let $H_1=h_1^2 I \ldots, H_b=h_b^2 I$ be a set of analysis bandwidths generated as above, which are in a a priori known range of data scales. Denote by $(\mu_1, E_1), \ldots, (\mu_b, E_b)$ the corresponding set of estimates and denote by $p_1 \ldots p_b$ the associated normal distributions. The stability test for distribution $p_j$ involves the computation of the overall dissimilarity between $p_j$ and its neighbors across scale $p_{j-w} \ldots p_{j-1}, p_{j+1} \ldots p_{j+w}$. In a preferred embodiment, $w=1$.

A dissimilarity measure according to an embodiment of the present invention comprises a specialized version of the Jensen-Shannon divergence, which is defined for the d-variate normal distributions $p_j, j=1 \ldots r$ as:

$$JS(p_1 \ldots p_r) = \tag{39}$$

$$\frac{1}{2}\log \frac{\left|\frac{1}{r}\sum_{j=1}^{r}\sum_{j}\right|}{\sqrt{\prod_{j=1}^{r}|\Sigma_j|}} + \frac{1}{2}\sum_{j=1}^{r}(\mu_j - \mu)^T \left(\sum_{j=1}^{r}\sum_{j}\right)^{-1}(\mu_j - \mu)$$

with $$\mu = \frac{1}{r}\sum_{j=1}^{r}\mu_j.$$

This formula is derived in Section 7 below. Observe that for $r=2$, the specialized Jensen-Shannon divergence reduces to the well known Bhattacharyya distance.

2(C)(iv) Summary of Mode Detection Using Data Driven Bandwidth Selection

In general, a method for detecting modes of an underlying multi-dimensional data structure comprises the steps of: (i) performing a data-driven bandwidth selection process for selecting an optimal bandwidth matrix (comprising multiple scales for multi-dimensional data) for each data point; and (ii) performing a variable bandwidth mean shift using the selected bandwidth matrices to detect modes in the multi-dimensional data.

Further, a data-driven bandwidth selection process according to the invention generally comprises two stages. The first stage is defined at the partition level and determines a mean and covariance matrix for each mode detected through multi-scale analysis. The second stage is defined at the data level and selects for each data point the most stable mean and covariance across the analysis scale.

Figure 7:
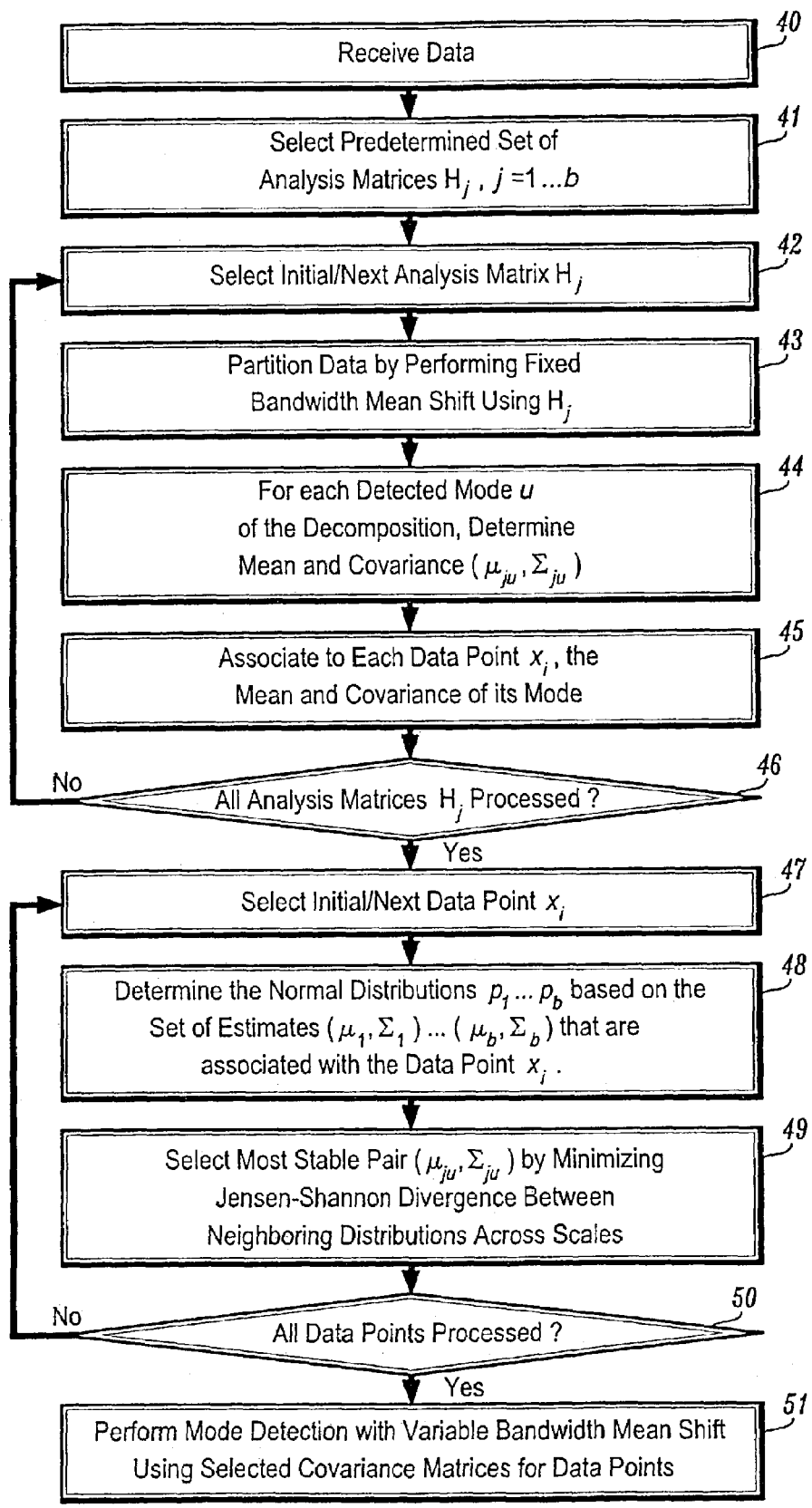
FIG. 7 is a method for mode detection using a data-driven variable bandwidth scale selection method according to an embodiment of the present invention.

FIG. 7 is a flow diagram of a method for mode detection using a data-driven scale selection method and variable bandwidth means shift method according to the invention. The method of FIG. 7 can advantageously be used for detecting modes in multi-dimensional data. In general, as noted above, the first stage of the process depicted in FIG. 7 comprises bandwidth matrix selection (steps 41–50) followed by a variable-bandwidth mean shift using the selected bandwidth matrices to detect the modes (step 51). The process of bandwidth selection comprises a method for evaluating the bandwidth at the partition level (steps 41–46) and method for evaluating the bandwidth at the data level (steps 47–50).

More specifically, referring to FIG. 7, initially, a set of n data points $x_i, i=1 \ldots n$ is received as input for processing (step 40). The data may comprise image data, speech data, handwriting data, etc., wherein mode detection is used for further processing (data clustering, image segmentation, speech recognition, handwriting recognition, etc.). Then, a predetermined set of analysis matrices $H_j, j=1 \ldots b$, where $H_j = (H_1 = h_1^2 I, \ldots, H_b = h_b^2 I)$ (which are preferably constructed on a logarithmic scale) is initially selected (step 41) for partitioning the data. As noted above, the bandwidth selection protocol makes no assumptions regarding the underlying data except that the data has some scale range.

Then, for each analysis matrix $H_j, j=1 \ldots b$, starting with an initially selected analysis matrix (step 42), the data is partitioned via the fixed bandwidth mean shift method using the selected analysis matrix $H_j$ (step 43). The result of such partitioning is that each data point will converge to some peak (mode) for the selected analysis matrix.

Then, for each mode u of the decomposition, the mean and covariance pair $(\mu_{ju}, \Sigma_{ju})$ is determined (step 44). More specifically, in one embodiment, for the given analysis matrix $H_j$, all the data points that converge to the same peak (mode) are grouped together (see, e.g., FIG. 5). For each group, the mean and covariance is determined, preferably by using the location of the mode to determine the mean $\Im_{ju}$ and using equations (37) or (38) to determine the covariance $\Sigma_{ju}$. Then, each data point $x_i$ is associated with the mean and covariance of its mode (step 45). This process (steps 42–45) is performed for each of the analysis matrices $H_j$. The result of this process is that each data point $x_i$ will have a set of mean/covariance pairs for each scale $H_j, j=1 \ldots b$.

When all analysis matrices $H_j$ have been processed (affirmative result in step 46), the local bandwidths for each data point will be evaluated at the data level. Initially, a first data point is selected (step 47). Based on the set of estimates $(\mu_1, E_1) \ldots (\mu_b, E_b)$ associated with the selected data point, the normal distributions $p_1 \ldots p_b$ are determined (step 48). Then, the most stable pair $(\mu, E)$ is selected by minimizing the Jensen-Shannon divergence between neighboring distributions across scales (step 49), as discussed in detail in section 2(C)(iii). This test across scales results in one scale for which the test measure is minimal, which means that the data is most stable (i.e., the mean/covariance pair having the least divergence across the scales). This process (steps 47–49) is performed for all data points. The selected covariance ⊠ for a given data point represents the local bandwidth for the data point.

Then, after all data points are processed (affirmative result in step 50), a mode detection process is performed via a Variable Bandwidth Mean Shift using the selected bandwidth matrices for the data points (step 51).

2 (C)(v) Sample Size

While a large sample approximation is not critical for equation (34), the sparse data needs attention. Preferably, the local sample size should be sufficiently large for inference. A bandwidth selection process according to the invention is preferably based on the known Effective Sample Size which computes the kernel weighted count of the number of points in each window:

$$ESS(x; H) = \frac{\sum_{i=1}^{n} K_H(x - x_i)}{K_H(0 - 0)} = \frac{\sum_{i=1}^{n} \exp\left(-\frac{1}{2} d^2(x, x_i, H)\right)}{\exp\left(-\frac{1}{2} d^2(0, 0, H)\right)} \quad (40)$$

Using the binomial rule of thumb, we cancel the interference when ESS (x; H)<5.

2(C)(vi) Bandwidth Selection Examples

Figure 8B:
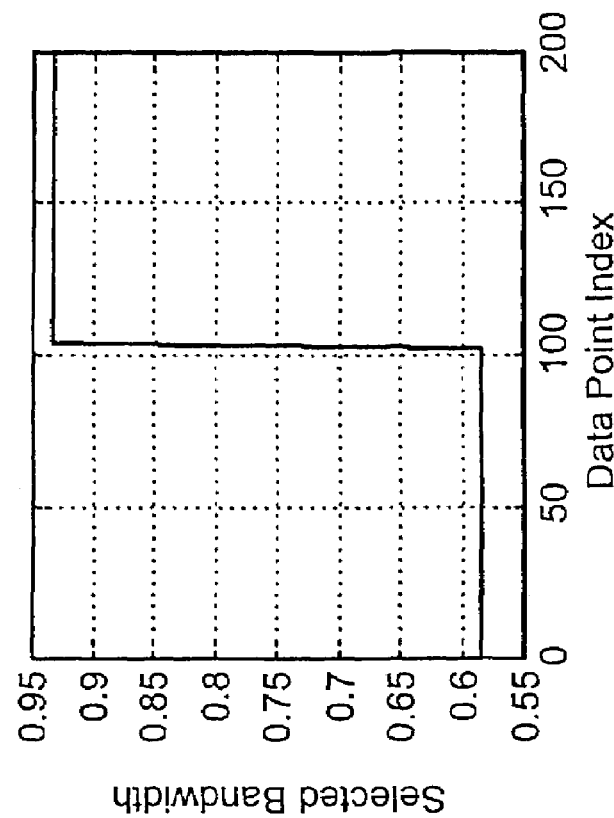
Figure 8A:
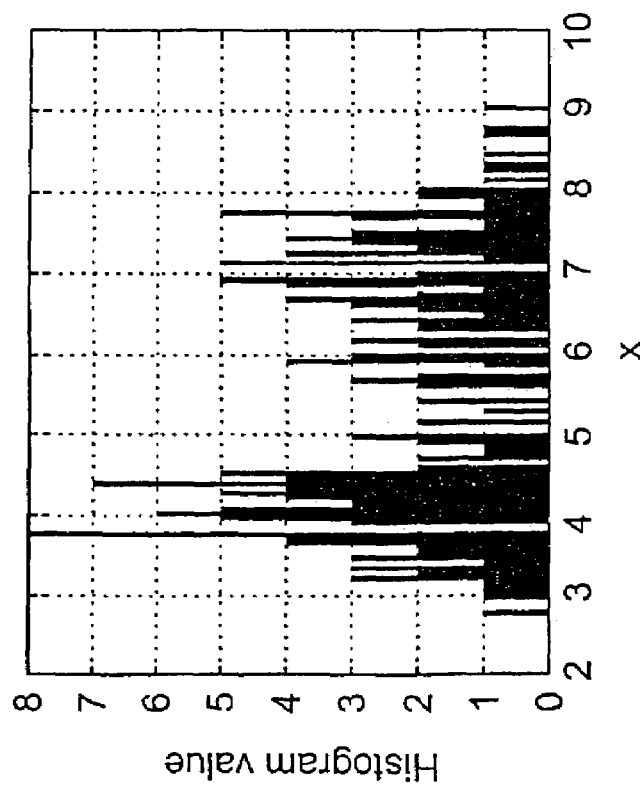

FIG. 8 is an exemplary diagram illustrating results of the data-driven bandwidth selection method according to the invention. FIG. 8a is a histogram of a bimodal data set generated with equal probability from N (4, 0.5) and N (7,1) with a total n=200 points. The standard deviation for each distribution (measured before amalgamating the data) was 0.53 and 0.92. FIG. 8b illustrates the selected bandwidth for each data point using a data-driven bandwidth selection process according to the invention. For presentation, the data point index increases with location. In FIG. 8b, for the first 100 points and the next 100 points, ⊠was determined to be 0.58 and 0.93, respectively. We used 8 analysis bandwidth in the range of 0.3–1.42 with a ratio of 1.25 between two consecutive bandwidths. For all the experiments presented henceforth, the same ratio of 1.25 was applied between two consecutive bandwidths. The specialized Jensen-Shannon divergence was computed with r=3 (three consecutive bandwidths). No other additional information was used.

Figure 9B:
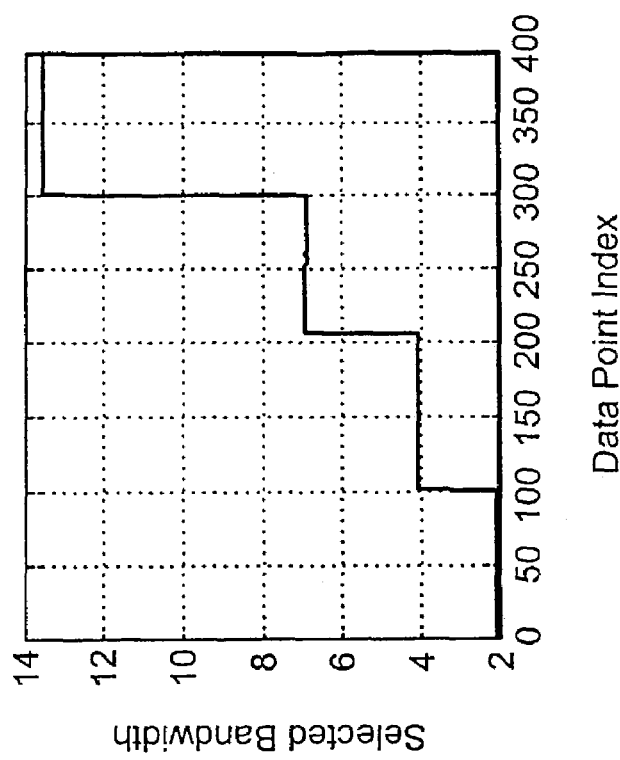
Figure 9A:
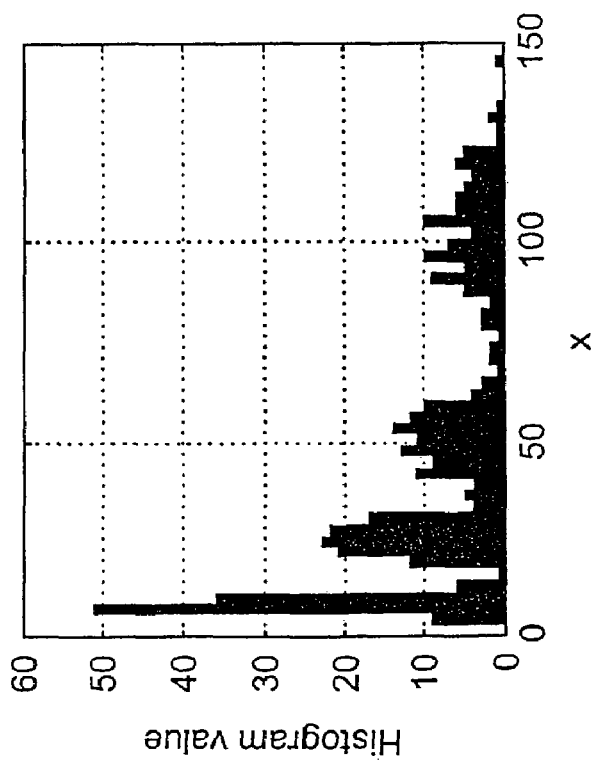

FIG. 9 is another exemplary diagram illustrating results of the data-driven bandwidth selection method according to the invention. FIG. 9a is a histogram of an input data set drawn with equal probability from N (8, 2), N (25, 4), N (50, 8), and N (100, 16), with a total n=400 data points. FIG. 9b illustrates the selected bandwidth for each data point using a data-driven bandwidth selection process according to the invention. For presentation, the data point index increases with location. As is apparent in FIG. 9b, the selected bandwidths were close to the measured standard deviations for the normals. In FIG. 9, 12 analysis bandwidths were used in the range of 1.5–17.46.

Figure 10B:
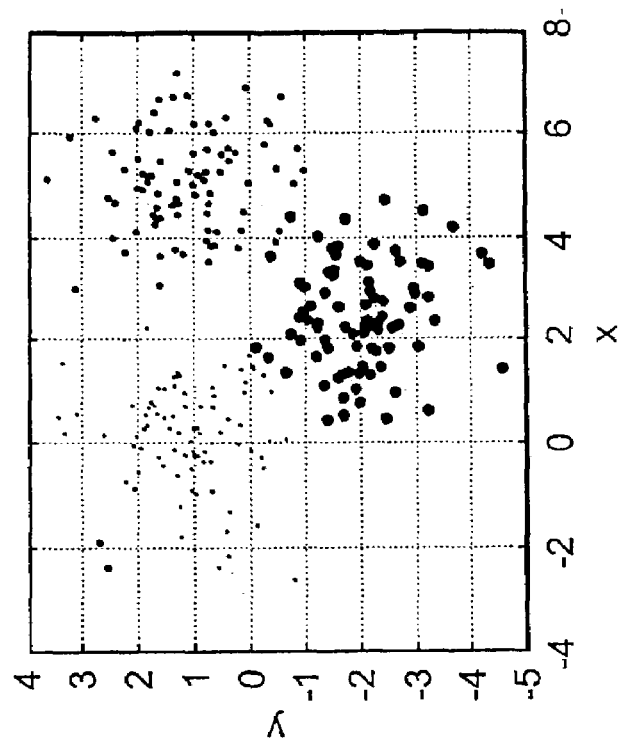
FIG. 10b illustrates a selected bandwidth for each data point.
Figure 10A:
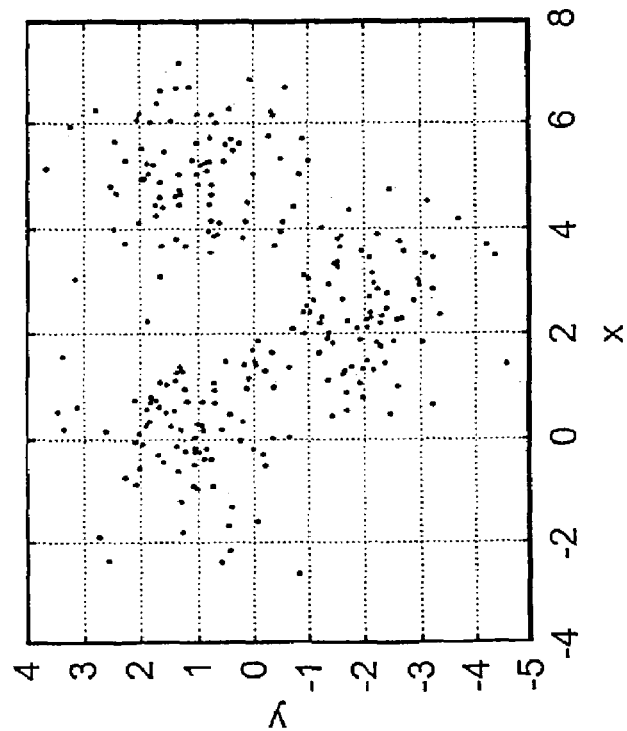

FIG. 10 is another exemplary diagram illustrating results of the data-driven bandwidth selection method according to the invention. FIG. 10a depicts bivariate data drawn with equal probability from N ([1,1],I), N([2.5,−2],I), and N([5, 1],I), where I=1 and n=250 points. The bandwidth selection process was run with 6 analysis bandwidths in the range 0.5–1.5. The algorithm detected three classes of bandwidths; 0.96, 1.04 and 1.08. In FIG. 10b, the bandwidth associated with each data point is indicated by the bullet (smallest bullets for 0.96, largest bullets for 1.08). Note, however, that the allocated bandwidths are very close to the true data scale.

2(D) Clustering Structures with Multiple Scales

Figure 11A:
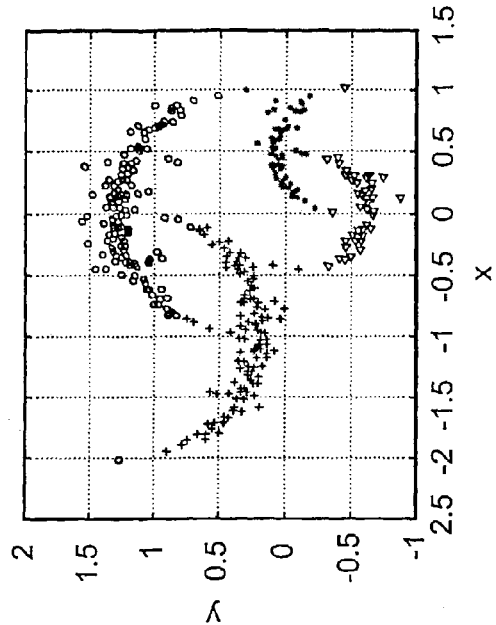
Figure 11B:
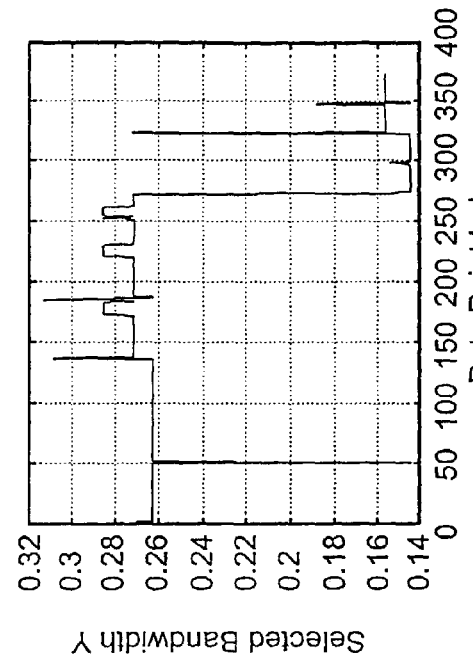
Figure 11C:
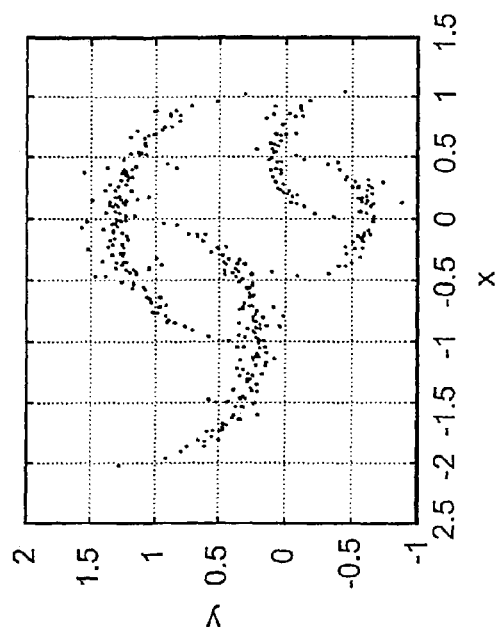
Figure 11D:
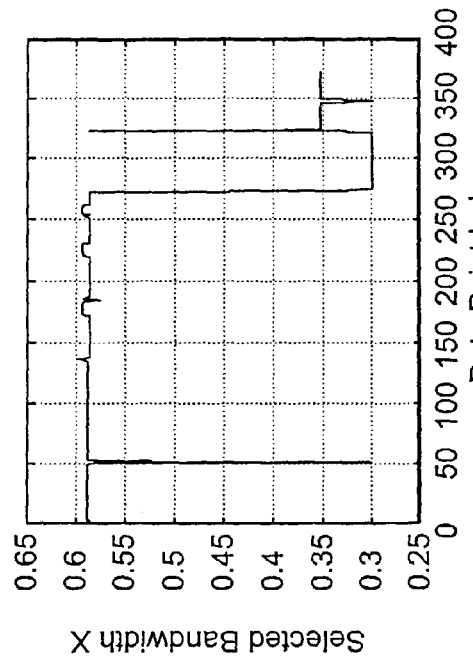

FIGS. 11b–d are diagrams illustrating experimental results obtained for the data presented in FIG. 11a. FIG. 11a depicts input data (n=400) containing structures as different scales. The bandwidth selection algorithm was run with 6 analysis bandwidths in the range of 0.1–0.3. Expression (38) was used to estimate a diagonal form for the covariance matrix associated with each data point. The results are presented in FIG. 11c for the scales associated with the coordinate x and FIG. 11d for the scales associated with the coordinate y of each data point.

Observe that the elongated structure of the data is reflected in a larger bandwidth for the coordinate x. Also, each graph contains two distinct groups of scale values corresponding to the two scales in the data. The spurious peaks represent points located on the border between two structures. Finally, note that for both coordinates, the smaller scale is approximately half of the larger scale, similar to the data characteristics.

FIG. 11b depicts the final clustering of the data obtained via the variable bandwidth mean shift using the bandwidths shown in FIG. 11c and FIG. 11d. The algorithm detected 4 modes and the resulting partitioning is shown in FIG. 11b. Note that most algorithms using one analysis bandwidth are prone to fail for this type of data. If the bandwidth is large, the two small structures will be joined together. If the bandwidth is small each of the two large structures will be divided.

2 (E) Discussion

It is useful to contrast the data-driven bandwidth selection methods described herein against some classical alternatives. The known "EM" algorithm also assumes a mixture of normal structures and finds iteratively the maximum-likelihood estimates of the a priori probabilities, means, and covariances. However, the EM needs the specification of the number of clusters, needs a good initialization, and does not deal with non-normal structures. In addition, its convergence is difficult when the number of clusters is large, determining the increase of the number of parameters.

The methods described herein according to the invention are not affected by the number of clusters since no global criterion is applied that should be optimized. We only use a priori knowledge of a range of viable scales, which is a very practical criterion. In almost all situations, the user has this knowledge. In addition, our normality assumption is only for bandwidth selection. The overall algorithm maintains the ability of analyzing complex, non-normal structures.

Let us also contrast the proposed algorithm with methods based on multi-scale analysis. From this point of view and according to our knowledge, this is the first method which tests the stability of the second order statistics derived from the data. Up to now, the stability testing was limited to the first order statistics such as the mean, the mode, or direction vectors. By checking the stability of the covariance matrix through the specialized Jensen-Shannon divergence, we increase the amount of information involved in the test.

Finally, in another embodiment, the method can be enhanced by replacing the least square estimation with a robust method. For example, a weighted least squares solution may be used. A data-driven bandwidth selection method according to the invention is useful for scenarios involving multi-scale patterns, such as feature space partitioning in tracking, background modeling and segmentation. Several applications of the present invention will now be discussed in further detail.

3. Video Data Analysis

A fundamental task in video data analysis is to detect blobs represented by collections of pixels that are coherent in spatial, range, and time domain. The two dimensional space of the lattice is known as the spatial domain while the gray level, color, spectral, or texture information is represented in the range domain.

Based on the new estimators discussed above in sections 1 and 2, an autonomous method according to an embodiment of the invention for segmenting a video frame into representative blobs detected in the spatial and color domains, will now be discussed. The technique can be naturally extended to incorporate time information.

We selected the orthogonal features $I1=(R+G+B)/3$, $I2=(R-B)/2$ and $I3=(2G-R-B)/4$ to represent the color information. Due to the orthogonality of the features, the one dimensional plug-in rule for bandwidth selection can be applied independently for each color coordinate.

The idea is to apply the mean shift procedure for the data points in the joint spatial-range domain. Each data point becomes associated to a point of convergence which represents the local mode of the density in a $d=2+3$ dimensional space (2 spatial components and 3 color components).

Preferably, a spherical kernel is employed for the spatial domain and a product kernel for the three color components. The efficiency of the product kernel is known to be very close to that of spherical kernels. Preferably, due to the different nature of the two spaces, the problem of bandwidth selection is treated differently for each space.

Figure 12:
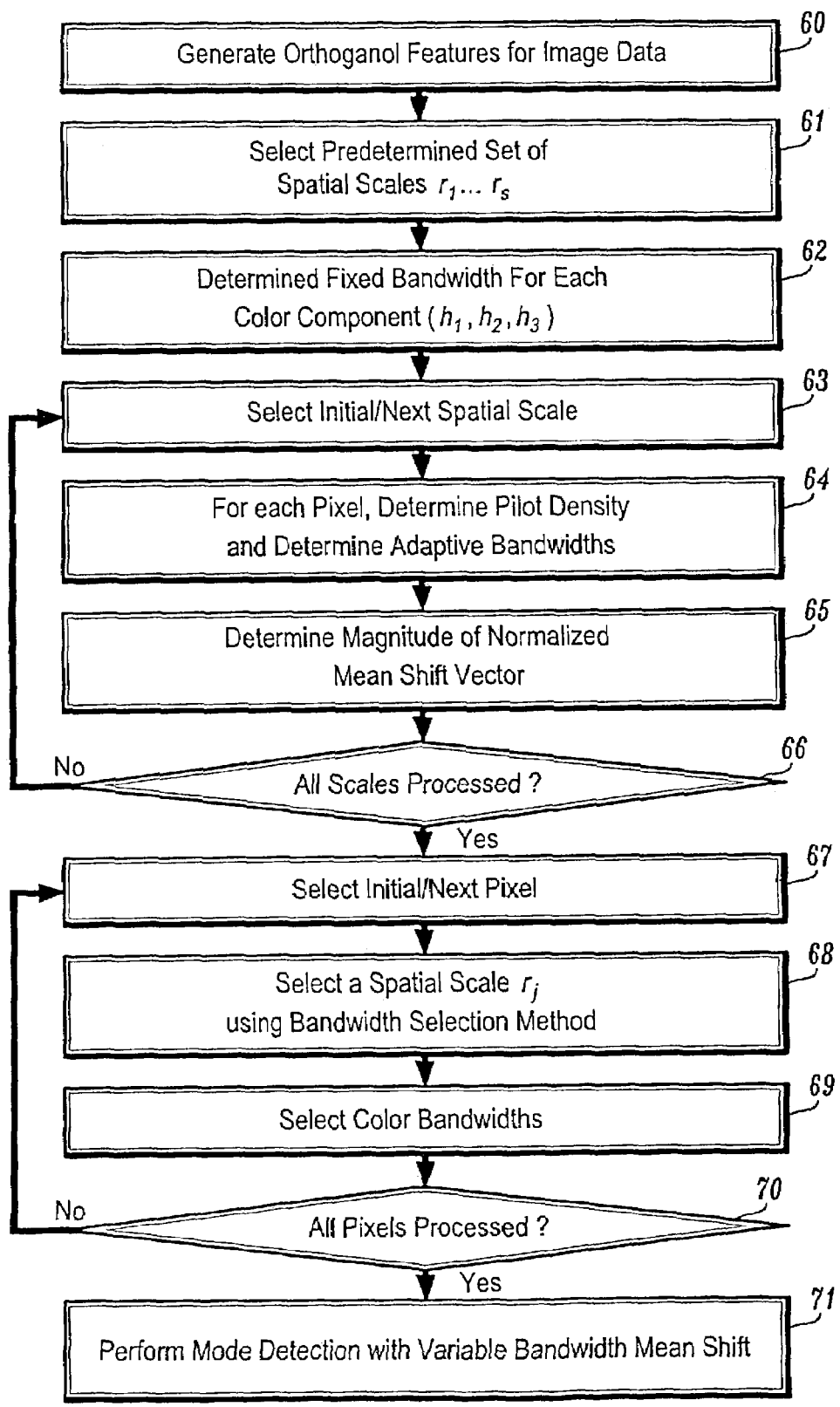
FIG. 12 is a flow diagram illustrating a method for performing an adaptive mean shift segmentation method according to an embodiment of the present invention.

FIG. 12 is a flow diagram of a method for adaptive mean shift segmentation according to an embodiment of the present invention. Initially, orthogonal features are generated for image data (step 60) as discussed above. A predetermined set of spatial scales $r_1 \ldots r_s$ is then selected (step 61). Given the image pixels $\{x_i; I1_i, I2_i, I3_i\}_{i=1 \ldots n}$, and the range of spatial scales $r_1 \ldots r_s$, a fixed bandwidth is derived $(h_1, h_2, h_3)$ for each color feature (step 62) using the one dimensional rule. Then, for an initially selected spatial scale $r_1$ (step 63), for each pixel, the adaptive bandwidths $h_1(x_i; r_1)$, $h_2(x_i; r_1)$, $h_3(x_i; r_1)$ are determined via equation (8) (using determined pilot density for pixel) (step 64). Then, the magnitude of the normalized mean shift vector $M(x_i; r_1)$ is determined for each pixel (step 65). The process is repeated for all remaining scales $r_2 \ldots r_s$ of the spatial kernel.

When all scale are process (affirmative result in step 66), for a given pixel (step 67), a spatial scale $r_j$ is selected using a data-driven bandwidth selection process (step 68) as described in Section 2. In addition, the given pixel, the color bandwidths bandwidths $h_1(x_i; r_j)$, $h_2(x_i; r_j)$, $h_3(x_i; r_j)$ are selected (step 69). This process (steps 68-69) is repeated for all pixels. As a result, each pixel receives a unique color bandwidth for color and a unique spatial bandwidth.

Next, to obtain the segmented image, the variable bandwidth mean shift procedure is performed in the joint domain (step 71) and blobs are identified as groups of pixels having the same connected convergence points.

Experiments have shown that the segmentation method works well for image data with very different statistics. In addition, experiments have shown the stability of the algorithm in segmenting a sequence obtained by panning a camera. The identified blobs are maintained very stable, although the scene data changed gradually along with the camera gain.

An attractive property of the segmentation method described above is the automatic bandwidth selection in both color and spatial domain. The reason that two different bandwidth selection techniques were used for the two spaces is not arbitrary. While the color information can be collected across the image, allowing the computation of robust initial bandwidth for color, the spatial properties of the blobs vary drastically across the image, requiring local decisions for spatial scale selection.

4. Illumination Invariant Segmentation

To obtain robustness against changes in illumination, the RGB data is often nonlinearly transformed into color invariant spaces such as normalized color spaces. Traditionally, the second order effects generated by the transformation are ignored or empirically thresholded. In accordance with another aspect of the present invention, a unified framework is provided that uses error propagation to model the uncertainty of the transformed colors, and then exploits this uncertainty for segmentation in the invariant space. The main statistical tool that utilizes the variable uncertainty is the variable-bandwidth mean shift, an-adaptive estimator of the density gradient. This technique is applied to detect high density points (i.e., modes) in the joint spatial-color domain. The image segments are delineated by identifying the valleys surrounding the density modes.

4(A) Motivation

The second order effects generated by nonlinear transformations applied to the RGB data are most often ignored or empirically thresholded. Only recently, these effects have been taken into account for building adaptive histograms or adaptive density estimates in the transformed space.

According to the present invention, a unified framework is provided that exploits the uncertainty of the transformed colors for video data segmentation in the invariant space. In one embodiment, the transformation from RGB to normalized rg is provided. To process data with variable uncertainty, the variable-bandwidth mean shift is employed. The color uncertainty is derived through noise measurement in the RGB space and error propagation. The variable-bandwidth mean shift identifies modes in the joint spatial-color space, while the image segments are delineated by detecting the valleys surrounding the modes.

4(B) Error Propagation in Invariant Space

This section discuses the color-dependent uncertainty (covariance matrices) in the invariant space. For a given location (x,y) in an image, we denote by $\hat{R}(x,y)$, $\hat{G}(x,y)$, $\hat{B}(x,y)$ the observed color data. Assume that $\hat{R}$, $\hat{G}$, and $\hat{B}$ are normal with mean R, G, and B, and identical standard deviation ⑨. To derive the uncertainties in the normalized color space, we adopt the computations presented in Greiffenhagen, et al. "Statistical Modeling and Performance Characterization of a Real-Time Dual Camera Surveillance System," In *Proceedings IEEE Conference On Computer Vision and Pattern Recognition*, Hilton Head, S.C., Vol. II, pages 335–342, June 2000.

The illumination prior assumption is that the scene contains multiple light sources with the same spectral distribution with no constraint on individual intensities. An invariant representation of the color data is obtained through the transformation: $T:R^3 \rightarrow R^2$ which normalizes R and G by S=R+G+B:

$$r = \frac{R}{R+G+B} \quad g = \frac{G}{R+G+B} \quad (41)$$

Due to the nonlinear character of the transformation T(.), the uncertainties in the normalized estimates $\hat{r}$ and $\hat{g}$ are dependent not only on sensor noise variance, but also on the actual true unknown values of the underlying samples. Based on the assumption of a moderate signal to noise ratio (i.e., σ<<S), $(\hat{r},\hat{g})^T$ can be approximated as normal distributed with pixel-dependent covariance matrix:

$$\begin{pmatrix} \hat{r} \\ \hat{g} \end{pmatrix} \sim N\left(\begin{pmatrix} r \\ g \end{pmatrix}, \Sigma_{\hat{r},\hat{g}}\right) \quad (42)$$

where $$\Sigma_{\hat{r},\hat{g}} = \begin{pmatrix} \sigma_r^2 = E[(\hat{r}-r)^2], & E[(\hat{r}-r)(\hat{g}-g)] \\ E[(\hat{r}-r)(\hat{g}-g)], & \sigma_g^2 = E[(\hat{g}-g)^2] \end{pmatrix} \quad (43)$$

$$= \frac{\sigma^2}{S^2}\begin{pmatrix} 1 - \frac{2R}{S} + 3\frac{R^2}{S^2}, & -\frac{R+G}{S} + 3\frac{RG}{S^2} \\ -\frac{R+G}{S} + 3\frac{RG}{S^2}, & 1 - \frac{2G}{S} + 3\frac{G^2}{S^2} \end{pmatrix}$$

In the normalized space, the covariance matrix for each pixel is different: darker regions in the RGB image (i.e., small S) correspond to regions with high variance in the normalized image.

4(C) Density Estimation in Joint Spatial-Color Domain

Following the color transformation from RGB to normalized rg space, each image pixel z is characterized by a location $x=(x_1,x_2)^T$ and a color $c=(c_1,c_2)^T\equiv(r,g)^T$. In other words, an input image of n pixels is represented as a collection of d=4-dimensional points $z_i=(x_i^T,c_i^T)^T, i=1 \ldots n$. The 4-dimensional space constructed as above is called the joint spatial-color domain.

The task of image segmentation reduces to the partitioning of the data points $z_i$ according to their probability density. The number of image segments is determined by the number of modes in the joint space, while the segment delineation is defined by the valleys that separate the modes.

To estimate the probability density in the joint space, a product kernel with variable bandwidth for the color coordinates is preferably used. The rationale is that in the normalized color space the uncertainty varies with the location, as shown in section 4(B). It has been proven that by adapting the kernel bandwidth to the statistics of the data, the estimation bias decreases. We denote by $$H_i = diag\{h_{i1}^2, h_{i2}^2\},$$

the bandwidth matrix associated with the color component of data point i. $H_i$ quantifies the uncertainty of $c_i$. The bandwidth for the spatial domain is taken constant and isotropic, i.e., $H=hI_2$ where $I_2$ is the unit matrix of dimension 2.

The density estimator with normal kernel computed at location $z=(x^T,c^T)^T$ is given by:

$$\hat{f}(z) = \frac{1}{n(2\pi)^{d/2}} \sum_{i=1}^{n} \frac{1}{h^2}\exp\left(-\frac{1}{2}d^2(x, x_i, H)\right) \times \quad (44)$$
$$\frac{1}{h_{i1}h_{i2}}\exp\left(-\frac{1}{2}d^2(c, c_i, H_i)\right)$$

where $$d^2(c, c_i, H_i) \equiv (c - c_i)^T H_i^{-1}(c - c_i) \quad (45)$$

is the Mahalanobis distance from c to $c_i$. A similar definition holds for $d^2(x,x_i,H_i)$ Using the notations:

$$\alpha_i(x) = \frac{1}{h^2}\exp\left(-\frac{1}{2}d^2(x, x_i, H)\right) \quad (46)$$

and $$\beta_i(c) = \frac{1}{h_{i1}h_{i2}}\exp\left(-\frac{1}{2}d^2(c, c_i, H_i)\right) \quad (47)$$

equation (44) becomes:

$$\hat{f}(z) = \frac{1}{n(2\pi)^{d/2}} \sum_{i=1}^{n} \alpha_i(x)\beta_i(c) \quad (48)$$

The next section shows the computation of local modes (peaks) of the density function (48).

4D Mode Detection

Mode detection in the joint space employs mean shift iterations for both x and c components of z. By taking the gradient of equation (48) with respect to x, after some algebra, it results that the mean shift vector for the x component is given by:

$$m_x(z) = \frac{\sum_{i=1}^{n} \alpha_i(x)\beta_i(c)x_i}{\sum_{i=1}^{n} \alpha_i(x)\beta_i(c)} - x \quad (49)$$

The gradient of (48) with respect to c yields the mean shift vector for the c component:

$$m_c(z) = H_c(z)\sum_{i=1}^{n} \alpha_i(x)\beta_i(c)H_i^{-1}c_i - c \quad (50)$$

where $$H_c(z) = \left(\sum_{i=1}^{n} \alpha_i(x)\beta_i(c)H_i^{-1}\right)^{-1} \quad (51)$$

Equations (49) and (50) provide the components of the joint mean shift vector $$m(z) = (m_x^T(z), m_c^T(z))^T \quad (52)$$

The iterative computation of the vector (52) and translation of z by that amount, leads to a local mode (peak) of the density (48).

4E System/Method for Illumination Invariant Segmentation

By estimating first the sensor noise, relation (43) can be employed to compute the covariance matrix associated with the normalized color of each pixel. The components of the color bandwidth matrix $$H_i = diag\{h_{i1}^2, h_{i2}^2\}$$

are taken proportionally to $\sigma_r^2$ and $\sigma_g^2$, respectively. The mode estimation process is thus adapted to the local uncertainty in the data. Preferably, the contribution of $E[(\hat{r}-r)(\hat{g}-g)]$ from equation (43) is neglected.

Using the algorithm presented in Section 4D, the modes in the joint space are first detected. Since plateaus may appear in the density function, the modes that are sufficiently closed to each other are grouped together and a label is assigned to each group. The metric for distance evaluation is based on the matrices H and $H_c(z)$(computed in the convergence point). Region delineation is then obtained by associating each pixel to its mode and assigning the label of the group to which the mode belongs to.

Figure 13:
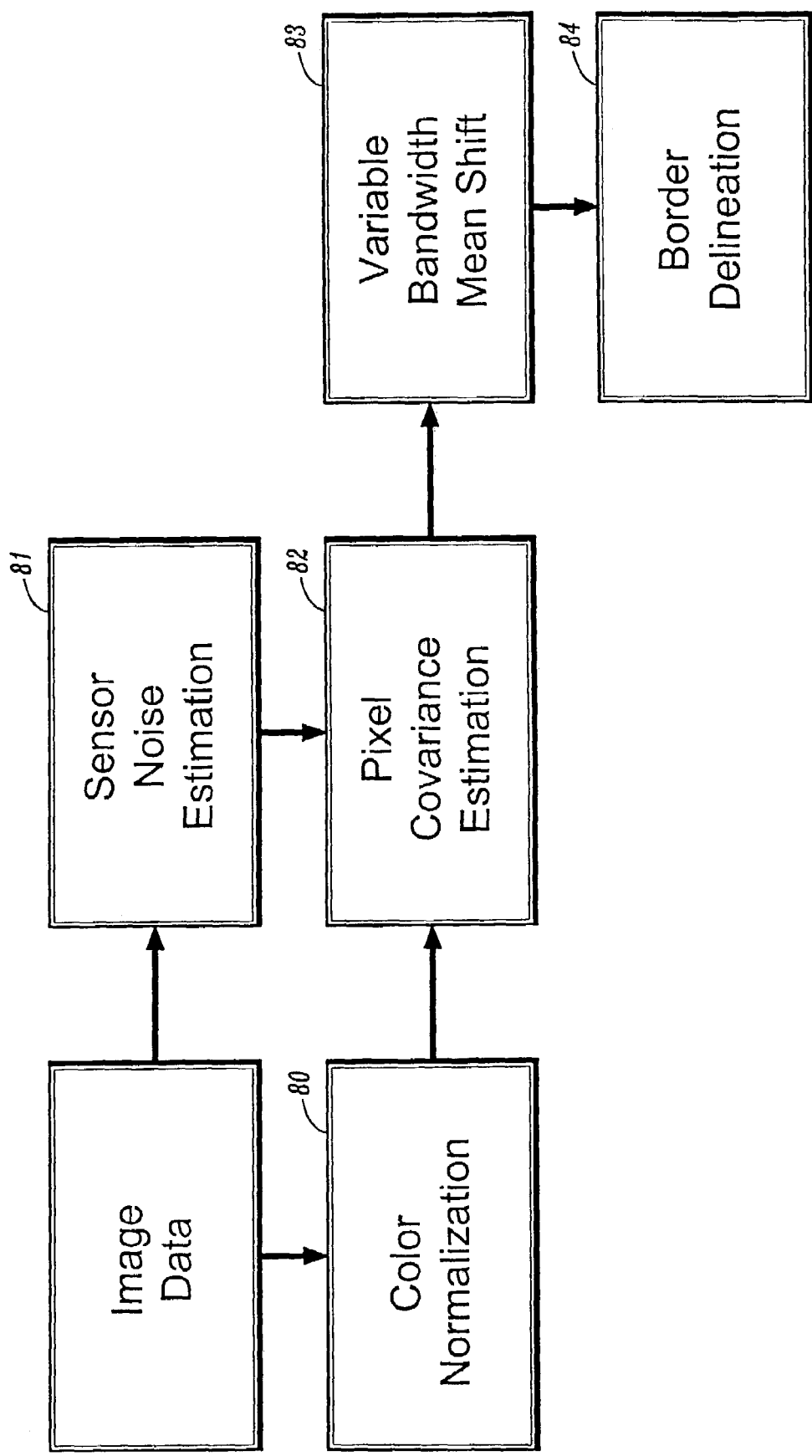
FIG. 13 is a block diagram of a system and method for providing illumination invariant segmentation of image data according to an embodiment of the present invention.

FIG. 13 is a block diagram of a system and method for illumination invariant segmentation according to an embodiment of the present invention. Image data is normalized via module 80 (using equation (41)). A sensor noise estimation module 81 estimates the noise (detects ⊠) using any known method. A pixel covariance estimation module 82 estimates the bandwidth via equation (43). Module 83 applies the variable bandwidth mean shift (equation 52) using the estimated bandwidth to detect the modes in the image data. A border delineation module 84 then detects borders in the image data as described herein. The nonlinearity induced by the color transformation is taken into account to compute the local uncertainty of each pixel in the normalized space. The uncertainty is further used in the variable bandwidth mean shift to identify modes in the feature space.

An illumination invariant segmentation method according to the present invention will more accurately segment contours in an image, in comparison to a segmentation based on L* u* v* colors. For example, a segmentation method of the present invention is not influenced by the shadows that are in the image. Segmentation in the normalized subspace is thus particularly advantageous when the frames of a video sequence are known to contain shadows or illumination effects. It is to be appreciated that the proposed method can be applied to other illumination or geometric invariants.

5. One-Dimensional "Plug-in" Method

Step 1: Compute $\hat{\gamma}=Q_3-Q_1$, the sample interquartile range.

Step 2: Compute $$a = 0.920\hat{\gamma}n^{-\frac{1}{7}}, b = 0.912\hat{\gamma}n^{-\frac{1}{9}}.$$

Step 3:

$$\hat{T}_D(b) = -\{n(n-1)\}^{-1}b^{-7}\sum_{i=1}^{n}\sum_{j=1}^{n}\phi^{vi}\{b^{-1}(x_i-x_j)\}$$

where $N^{vi}$ is the sixth derivative of the normal kernel.

Step 4:

$$\hat{S}_D(a) = \{n(n-1)\}^{-1}a^{-5}\sum_{i=1}^{n}\sum_{j=1}^{n}\phi^{iv}\{a^{-1}(x_i-x_j)\}$$

where $N^{iv}$ is the fourth derivative of the normal kernel.

Step 5: $\hat{\alpha}_2(h)=1.357\{\hat{S}_D(a)/\hat{T}_D(b)\}^{1/7}h_{5/7}$.

Step 6: Solve the equation in h $$[R(K)/\{\mu_2^2(K)\hat{S}_D(\hat{\alpha}_2(h))\}]^{\frac{1}{5}}n^{-\frac{1}{5}} - h = 0,$$

where $\mu_2(K)=\int z_1^2 K(z)dz$ and $R(K)=\int K(z)dz$, as defined above (equations (3) and (4)).

6. Convergence Proof for Variable Bandwidth Mean Shift

Since n is finite and the sequence $\hat{f}_K$ is bounded, it is therefore sufficient to show that $\hat{f}_K$ is strictly monotonic increasing, i.e., if $y_j \neq y_{j+1}$ then $\hat{f}_K(j) < \hat{f}_K(j+1)$, for all $j=1, 2, \ldots$.

By assuming without loss of generality that $y_j = 0$ we write $$\hat{f}_K(j+1) - \hat{f}_K(j) = \frac{1}{n}\sum_{i=1}^{n}\frac{1}{h_i^d}\left[k\left(\left\|\frac{y_{j+1}-x_i}{h_i}\right\|^2\right)\right] - k\left(\left\|\frac{x_i}{h_i}\right\|^2\right) \quad (6.1)$$

The convexity of the profile k implies that:

$$k(x_2) \geq k(x_1) + k'(x_1)(x_2 - x_1) \quad (6.2)$$

for all $x_1, x_2, [0, \infty)$, $x_1 \neq x_2$, and since $k' = -g$, the inequality (6.2) becomes $$k(x_2) - k(x_1) \geq g(x_1)(x_1 - x_2) \quad (6.3)$$

Using now (6.1) and (6.3), we have $$\hat{f}_K(j+1) - \hat{f}_K(j) \geq \frac{1}{n}\sum_{i=1}^{n}\frac{1}{h_i^{d+2}}g\left(\left\|\frac{x_i}{h_i}\right\|^2\right)[\|x_i\|^2 - \|y_{j+1} - x_i\|^2] \quad (6.4)$$

$$= \frac{1}{n}\sum_{i=1}^{n}\frac{1}{h_i^{d+2}}g\left(\left\|\frac{x_i}{h_i}\right\|^2\right)[2y_{j+1}^T x_i - \|y_{j+1}\|^2]$$

$$= \frac{1}{n}2y_{j+1}^T\sum_{i=1}^{n}\frac{x_i}{h_i^{d+2}}g\left(\left\|\frac{x_i}{h_i}\right\|^2\right) - \frac{1}{n}\|y_{j+1}\|^2\sum_{i=1}^{n}\frac{1}{h_i^{d+2}}g\left(\left\|\frac{x_i}{h_i}\right\|^2\right)$$

and by employing (17) it results that $$\hat{f}_K(j+1) - \hat{f}_K(j) \geq \frac{1}{n}\|y_{j+1}\|^2 \sum_{i=1}^{n}\frac{1}{h_i^{d+2}}g\left(\left\|\frac{x_i}{h_i}\right\|^2\right) \quad (6.5)$$

Since k is monotonic decreasing we have $-k'(x) \eta g(x) \mu 0$ for all $x, [0, \infty)$. The sum $$\sum_{i=1}^{n}\frac{1}{h_i^{d+2}}g\left(\left\|\frac{x_i}{h_i}\right\|^2\right)$$

is strictly positive, since it was assumed to be nonzero in the definition of the mean shift vector (12). Thus, as long as $y_{j+1} \neq y_j = 0$, the right term of (6.5) is strictly positive, i.e., $\hat{f}_K(j+1) - \hat{f}_K(j) > 0$. Hence the sequence $\hat{f}_K$ is convergent.

To show the convergence of the sequence $\{y_j\}_{j=1,2,\ldots}$. After some algebra, it results that $$\hat{f}_K(j+1) - \hat{f}_K(j) \geq \frac{1}{n}\|y_{j+1} - y_j\|^2 \sum_{i=1}^{n}\frac{1}{h_i^{d+2}}g\left(\left\|\frac{y_j - x_i}{h_i}\right\|^2\right) \quad (6.6)$$

Since $\hat{f}_K(j+1) - \hat{f}_K(j)$ converges to zero, (6.6) implies that $\|y_{j+1} - y_j\|$ also converges to zero, i.e., $\{y_j\}_{j=1,2,\ldots}$ is a Cauchy sequence. But any Cauchy sequence is convergent in the Euclidean space, therefore, $\{y_j\}_{j=1,2,\ldots}$ is convergent.

7. The Magnitude of the Bandwidth Normalized Mean Shift Vector m(x; H) is Maximized when H=E Recall that the magnitude of the bandwidth normalized mean shift vector is given by $$m(x; H) = \left\|H^{1/2}\left(\sum + H\right)^{-1}(x - \mu)\right\| \quad (7.1)$$

We assume that H and E are symmetric, positive definite matrices, and the magnitude of $x - \mu$ is strictly positive. We will show that $$m(x; \Sigma)^2 - m(x; H)^2 \geq 0 \quad (7.2)$$

with equality iff H=E.

The left side of (7.2) becomes $$m\left(x; \sum\right)^2 - m(x; H)^2 = \frac{1}{4}\left[\left\|\sum^{-1/2}(x-\mu)\right\|^2 - \right. \quad (7.3)$$

$$\left. 4\left\|H^{1/2}\left(\sum + H\right)^{-1}(x-\mu)\right\|^2\right]$$

$$= \frac{1}{4}(x-\mu)^T\left[\sum^{-1} - 4\left(\sum + H\right)^{-1}H\left(\sum + H\right)^{-1}\right](x-\mu)$$

$$= \frac{1}{4}(x-\mu)^T\left(\sum + H\right) - 1\left(H\sum^{-1} - I\right)^2\left(\sum + H\right)^{-1}(x-\mu)$$

where I is the d×d identity matrix. Within the conditions states, all the matrices in the last term of (7.3) are positive definite, excepting $(HE^{-1} - I)^2$ which is equal to 0 iff H=E. Q.E.D.

8. Overall Dissimilarity of a Set of Multivariate Normal Distributions

One of the few measures of the overall difference of more than two distributions is the generalized Jensen-Shannon divergence (see J. Lin, "Divergence Measures Based on the Shannon Entropy", *IEEE Trans. Information Theory*, 37:145–151, 1991.) Given r probability distributions $p^j, j=1\ldots r$, their Jensen-Shannon divergence is defined as:

$$JS(p_1 \ldots p_r) = H\left(\frac{1}{r}\sum_{j=1}^{r}p_j\right) - \frac{1}{r}\sum_{j=1}^{r}H(p_j) \quad (8.1)$$

where $$H(p(x)) = -\int p(x)\log p(x)dx \quad (8.2)$$

is the entropy of p(x). This divergence is positive and equal to zero iff all $p_j$ are equal. Using (8.2) in (8.1) we obtain:

$$JS(p_l \ldots p_r) = \frac{1}{r}\sum_{j=1}^{r}\int p_j(x)\log\frac{p_j(x)}{q(x)} \quad (8.3)$$

width $q(x) = \frac{1}{r}\sum_{j=1}^{r} p_j$

For the d-variate normal case, the distributions $p_j$ are defined by:

$$p_j(x) = \frac{1}{|2\pi \sum i|^{1/2}} \exp\left(-\frac{1}{2}(x-\mu_i)^T \sum_i^{-1} (x-\mu_i)\right) \quad (8.4)$$

A specialized version of the Jensen-Shannon divergence according to the present invention can be obtained by taking $q(x)$ as the most likely normal source for the homogeneous model $$\frac{1}{r}\sum_{j=1}^{r} p_j,$$

having the mean $$\mu = \frac{1}{r}\sum_{j=1}^{r} \mu_j,$$

and covariance $$\sum = \frac{1}{r}\sum_{j=1}^{r} \sum_j.$$

The new measure is equivalent to a goodness-of-fit test between the empirical distributions $p_j, j=1 \ldots r$ and the homogeneous model $$\frac{1}{r}\sum_{j=1}^{r} p_j.$$

To derive a closed form expression we use (8.4) and the identity $$x^T \sum^{-1} x = tr \sum^{-1} xx^T$$

to obtain:

$$\log\frac{p_i(x)}{q(x)} = \frac{1}{2}\log\frac{|\Sigma|}{|\Sigma_i|} - \frac{1}{2}tr\sum_i^{-1}(x-\mu_i)(x-\mu_i)^T + \quad (8.5)$$
$$\frac{1}{2}tr\sum^{-1}(x-\mu)(x-\mu)^T$$

for $i=1 \ldots r$ where tr denotes the trace of a matrix. Performing the integration yields:

$$\int p_i(x)\log\frac{p_i(x)}{q(x)}dx = \quad (8.6)$$
$$\frac{1}{2}\log\frac{|\Sigma|}{|\Sigma_i|} + \frac{1}{2}tr\sum_i^{-1}\sum\frac{d}{2} + \frac{1}{2}tr\sum^{-1}(\mu_i-\mu)(\mu_i-\mu)^T$$

Summing (8.6) for $I=1 \ldots r$ and substituting $$\sum = \frac{1}{r}\sum_{j=1}^{r}\sum_j$$

we have:

$$JS(p_1 \ldots p_r) = \frac{1}{2}\log\frac{\left|\frac{1}{r}\sum_{j=1}^{r}\sum_j\right|}{\sqrt[r]{\prod_{j=1}^{r}|\Sigma_j|}} + \frac{1}{2r}tr\left(\sum_{j=1}^{r}\sum_j\right)\left(\frac{1}{r}\sum_{j=1}^{r}\sum_j\right)^{-1} - \frac{r}{2} + \quad (8.7)$$

$$\frac{1}{2r}tr\left(\frac{1}{r}\sum_{j=1}^{r}\sum_j\right)^{-1}\sum_{j=1}^{r}(\mu_j-\mu)(\mu_j-\mu)^T$$

$$= \frac{1}{2}\log\frac{\left|\frac{1}{r}\sum_{j=1}^{r}\sum_j\right|}{\sqrt[r]{\prod_{j=1}^{r}|\Sigma_j|}} + \frac{1}{2}\sum_{j=1}^{r}(\mu_j-\mu)^T\left(\sum_{j=1}^{r}\sum_j\right)^{-1}(\mu_j-\mu)$$

where $\mu = \frac{1}{r}\sum_{j=1}^{r} \mu_j$.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for segmenting video data, comprising the steps of:
    receiving video data comprising a plurality of pixels;
    determining a color bandwidth for each pixel by determining an adaptive bandwidth from a fixed bandwidth;
    determining a local spatial bandwidth for each pixel using a data-driven variable bandwidth scale selection process;
    clustering the video data using a variable bandwidth mean shift process in the joint spatial-color domain by applying the determined local spatial bandwidths and color bandwidths of the pixels.

2. The method of claim 1, wherein the step of clustering comprises identifying blobs as groups of pixels having similar points of convergence as determined by the variable bandwidth mean shift process.

3. The method of claim 1, wherein the step of determining a color bandwidth for each pixel, comprises the steps of:
    (i) generating a plurality of color components, the color components comprising orthogonal color features that represent RGB colors in the video data;
    (ii) for each pixel, determining a fixed bandwidth for each color component;
    (iii) for each pixel, determining an adaptive color bandwidth for each color component using the corresponding fixed bandwidth; and
    (iv) repeating steps (ii) and (iii) for each spatial scale.

4. The method of claim 3, wherein the step of determining a fixed bandwidth for each color component comprises using a one dimensional plug in rule independently for each color component.

5. The method of claim 3, wherein the color component comprise orthogonal features $I_1=(R+G+B)/3$, $I_2=(R-B)/2$ and $I_3=(2G-R-B)/4$.

6. The method of claim 1, wherein the step of determining a local spatial bandwidth for each pixel using a data-driven variable bandwidth scale selection process, comprises the steps of:
    selecting a plurality of analysis scales;
    for each analysis scale, partitioning the data set into one or more modes and determining a mean/covariance pair for each mode, wherein each data point is associated with a detected mode and a corresponding mean/covariance pair of the mode for each of the analysis scales;
    for each pixel, determining the most stable mean/covariance pair associated with the data point; and
    for each pixel, selecting for output the covariance of the most stable mean/covariance pair as a variable bandwidth for the data point.

7. A method for segmenting video data, comprising the steps of:
    receiving video data comprising a plurality of pixels;
    determining an illumination invariant representation of RGB color data associated with each pixel;
    determining a covariance matrix associated with the illumination invariant representation of each pixel;
    determining modes in the video data using a variable bandwidth mean shift process,
    wherein local bandwidths for each pixel used in the variable bandwidth mean shift process are determined by the covariance associated with the pixel;
    grouping pixels that converge to the same mode; and
    determining image segments by identifying valleys surrounding the determined modes.

8. The method of claim 7, wherein the step of determining an illumination invariant representation comprises transforming the RGB data to a normalized rg space, wherein $r=R/(R+G+B)$ and $g=G/(R+G+B)$.

9. The method of claim 8, further comprising the step of determining a joint spatial-color domain comprising a 4-dimensional space.

10. The method of claim 7, wherein the step of determining pixel covariance comprises the steps of:
    determining sensor noise; and
    determining the covariance using the determined sensor noise.

11. A program storage device readable by a machine, tangibly embodying a program of instructions executable by the machine to perform method steps for segmenting video data, the method steps comprising:
    receiving video data comprising a plurality of pixels;
    determining a color bandwidth for each pixel by determining an adaptive bandwidth from a fixed bandwidth;
    determining a local spatial bandwidth for each pixel using a data-driven variable bandwidth scale selection process;
    clustering the video data using a variable bandwidth mean shift process in the joint spatial-color domain by applying the determined local spatial bandwidths and color bandwidths of the pixels.

12. The program storage device of claim 11, wherein the instructions for clustering comprise instructions for identifying blobs as groups of pixels having similar points of convergence as determined by the variable bandwidth mean shift process.

13. The program storage device of claim 11, wherein the instructions for determining a color bandwidth for each pixel comprise instructions for performing the steps of:
    (i) generating a plurality of color components, the color components comprising orthogonal color features that represent RGB colors in the video data;
    (ii) for each pixel, determining a fixed bandwidth for each color component;
    (iii) for each pixel, determining an adaptive color bandwidth for each color component using the corresponding fixed bandwidth; and
    (iv) repeating steps (ii) and (iii) for each spatial scale.

14. The program storage device of claim 13, wherein the instructions for determining a fixed bandwidth for each color component comprise instructions for using a one dimensional plug in rule independently for each color component.

15. The program storage device of claim 13, wherein the color component comprise orthogonal features $I_1=(R+G+B)/3$, $I_2=(R-B)/2$ and $I_3=(2G-R-B)/4$.

16. The program storage device of claim 11, wherein the instructions for determining a local spatial bandwidth for each pixel using a data-driven variable bandwidth scale selection process comprise instructions for performing the steps of:

selecting a plurality of analysis scales;

for each analysis scale, partitioning the data set into one or more modes and determining a mean/covariance pair for each mode, wherein each data point is associated with a detected mode and a corresponding mean/covariance pair of the mode for each of the analysis scales;

for each pixel, determining the most stable mean/covariance pair associated with the data point; and for each pixel, selecting for output the covariance of the most stable mean/covariance pair as a variable bandwidth for the data point.

17. A program storage device readable by a machine, tangibly embodying a program of instructions executable by the machine to perform method steps for segmenting video data, the method steps comprising:

receiving video data comprising a plurality of pixels;

determining an illumination invariant representation of RGB color data associated with each pixel;

determining a covariance matrix associated with the illumination invariant representation of each pixel;

determining modes in the video data using a variable bandwidth mean shift process, wherein local bandwidths for each pixel used in the variable bandwidth mean shift process are determined by the covariance associated with the pixel;

grouping pixels that converge to the same mode; and determining image segments by identifying valleys surrounding the determined modes.

18. The program storage device of claim 17, wherein the instructions for determining an illumination invariant representation comprise instructions for transforming the RGB data to a normalized rg space, wherein $r=R/(R+G+B)$ and $g=G/(R+G+B)$.

19. The program storage device of claim 18, further comprising instructions for performing the step of determining a joint spatial-color domain comprising a 4-dimensional space.

20. The program storage device of claim 17, wherein the instructions for determining pixel covariance comprise instructions for performing the steps of:

determining sensor noise; and determining the covariance using the determined sensor noise.

* * * * *